US012761343B2

(12) United States Patent
Abu Dabous et al.

(10) Patent No.: US 12,761,343 B2
(45) Date of Patent: Oct. 13, 2026

(54) HYBRID GROUND AND DRONE MOUNTED GPR INSPECTION SYSTEM

(71) Applicant: UNIVERSITY OF SHARJAH, Sharjah (AE)

(72) Inventors: Saleh Abu Dabous, Sharjah (AE); Mohamed Ait Gacem, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 19/436,641

(22) Filed: Dec. 30, 2025

(65) Prior Publication Data

US 2026/0186127 A1 Jul. 2, 2026

Related U.S. Application Data

(60) Provisional application No. 63/740,546, filed on Dec. 31, 2024.

(51) Int. Cl.
*G01S 13/88* (2006.01)
*G01S 7/02* (2006.01)
(Continued)

(52) U.S. Cl.
CPC ............ *G01S 13/885* (2013.01); *G01S 7/027* (2021.05); *G05D 1/622* (2024.01); *G05D 1/689* (2024.01); *G05D 2109/254* (2024.01)

(58) Field of Classification Search
CPC ....... G01S 13/885; G01S 7/027; G05D 1/622; G05D 1/689; G05D 2109/254
See application file for complete search history.

(56) References Cited

U.S. PATENT DOCUMENTS

| | | | | |
|---|---|---|---|---|
| 8,723,723 | B2 | 5/2014 | Al-Khalefah et al. | |
| 11,774,579 | B1 | 10/2023 | Wang et al. | |
| 2021/0132625 | A1 * | 5/2021 | Gillett | G05D 1/0088 |

FOREIGN PATENT DOCUMENTS

| | | | |
|---|---|---|---|
| CN | 114578349 | A | 6/2022 |
| CN | 113745824 | B | 4/2023 |

OTHER PUBLICATIONS

SPH Engineering, "SPH Engineering and Radar Systems, Inc. Introduce a Unique Universal GPR Model", Sep. 26, 2024, https://www.sphengineering.com/news/sph-engineering-and-radar-systems-inc-introduce-a-unique-universal-gpr-model, Accessed: May 8, 2026 (Year: 2024).*

(Continued)

*Primary Examiner* — Wade Miles
*Assistant Examiner* — Jaewook Jung
(74) *Attorney, Agent, or Firm* — MH2 Technology Law Group, LLP

(57) ABSTRACT

A Ground Penetrating Radar (GPR) inspection system comprises an autonomous vehicle module configured for ground-based navigation, an unmanned aerial vehicle module configured for aerial flight, and a GPR module comprising a detachable GPR inspection platform housing a GPR antenna. The GPR module is switchable between a first operational mode in which the detachable GPR inspection platform is mounted on the autonomous vehicle module for GPR inspection from a ground mounted position, and a second operational mode in which the detachable GPR inspection platform is mounted on the unmanned aerial vehicle module for GPR inspection from an aerial mounted position. The GPR module includes an automated attachment mechanism configured to selectively secure the detachable GPR inspection platform to either the autonomous vehicle module or the unmanned aerial vehicle module.

11 Claims, 12 Drawing Sheets

(51) Int. Cl.
*G05D 1/622* (2024.01)
*G05D 1/689* (2024.01)
*G05D 109/25* (2024.01)

(56) References Cited

OTHER PUBLICATIONS

García-Fernandez et al., "Analysis and Validation of a Hybrid Forward-Looking Down-Looking Ground Penetrating Radar Architecture", Remote Sens,. 2021, vol. 13, 1206, 18 pages.
Bandini et al., Mapping inland water bathymetry with Ground Penetrating Radar (GPR) on board Unmanned Aerial Systems (UASs). Journal of Hydrology, 2022, vol. 616, 128789, 15 pages. https://doi.org/10.1016/j.jhydrol.2022.128789.
García-Fernandez et al., "Bistatic Landmine and IED Detection Combining Vehicle and Drone Mounted GPR Sensors", Remote Sens., 2019, vol. 11, 2299, 14 pages. https://doi.org/10.3390/rs11192299.
Šipoš et al., "A Lightweight and Low-Power UAV-Borne Ground Penetrating Radar Design for Landmine Detection", Sensors (Basel), Apr. 15, 2020, vol. 20, No. 8, 2234, 18 pages.
Unknown Author, "Gekko-80 Datasheet", Geoscanners AB, 5 pages.
Nijeholt et al., "Utilizing Drone-Based Ground-Penetrating Radar for Crime Investigations in Localizing and Identifying Clandestine Graves" Sensors, 2023, vol. 23, 7119, 23 pages. https://doi.org/10.3390/s23167119.
Ruols et al., "Development of a drone-based ground-penetrating radar system for efficient and safe 3D and 4D surveying of alpine glaciers." Journal of Glaciology, 2023, vol. 69, No. 278, pp. 2087-2098. doi: 10.1017/jog.2023.83.
Noviello et al., "An Overview on Down-Looking UAV-Based GPR Systems", Remote Sens., 2022, vol. 14, 3245, 28 pages. https://doi.org/10.3390/rs14143245.

* cited by examiner (a)

(b)

HYBRID GROUND AND DRONE MOUNTED GPR INSPECTION SYSTEM

FIELD

The present disclosure relates to ground penetrating radar inspection systems, and more particularly but not exclusively to a hybrid integrated ground penetrating radar inspection system designed to perform both ground-based and drone-mounted GPR imaging using a detachable GPR inspection platform that can be selectively attached to either an autonomous ground vehicle or an unmanned aerial vehicle

BACKGROUND

Background description includes information that will be useful in understanding the present invention. It is not an admission that any of the information provided herein is prior art or relevant to the presently claimed invention, or that any publication specifically or implicitly referenced is prior art.

Ground Penetrating Radar (GPR) is a non-destructive inspection technique widely utilized in civil engineering applications for evaluating subsurface structures and features. GPR inspection finds application in various domains including pipeline assessment, underground utility detection, pavement evaluation, and oil and gas industry operations. The technology operates by transmitting electromagnetic waves into a surface and analyzing the reflected signals to generate images of subsurface conditions.

GPR inspection systems are typically deployed on various platforms depending on the nature of the surfaces being evaluated. Ground-based inspection vehicles and carts are commonly used for scanning horizontal or relatively even surfaces, while unmanned aerial vehicles (UAVs) or drones can be employed for accessing elevated or vertical structures. The selection of an appropriate inspection platform depends on factors such as surface accessibility, terrain characteristics, and the geometric orientation of the structures being evaluated.

Ground-based GPR inspection systems offer certain advantages for evaluating long surface sections at relatively high speeds while maintaining close proximity between the antenna and the ground surface. Generally, imaging performance improves when the separation distance between the GPR antenna and the inspected surface is minimized. However, ground-based systems face limitations when attempting to inspect vertical structures or surfaces located in areas that are difficult to access with wheeled vehicles. The operational range of ground-based systems is often constrained to relatively even surfaces in accessible locations.

Drone-based GPR inspection systems address some of the accessibility limitations of ground-based approaches by enabling the antenna to be positioned near vertical structures or in areas that cannot be reached by traditional ground vehicles. However, drone-based systems typically maintain a larger safety distance between the antenna and the inspected surface to avoid destabilizing contact during flight operations, which can affect imaging resolution.

Prior art systems for UAV-mounted geological radar, such as those designed for dam inspection applications, utilize specialized antenna arrays mounted on gimbals to maintain orientation relative to the inspected surface. These systems employ forward-looking laser rangefinders and sensor gimbals with tilt control algorithms to adapt to terrain variations during flight. The radar gimbals receive distance measurements and adjust the radar orientation to maintain parallelism with the ground surface. While such systems provide terrain-following capabilities for aerial inspection, they are dedicated to UAV-mounted operations and do not offer adaptability for ground-based deployment configurations.

Existing approaches that utilize either ground-based or drone-based GPR inspection as separate systems present challenges when comprehensive evaluation of structures with varying geometric characteristics is desired. When different antennas are used for ground-based and aerial inspection of the same structure, variations in antenna characteristics can introduce distortions in the collected radargrams, potentially affecting evaluation accuracy. Additionally, maintaining separate ground-based and aerial inspection systems increases equipment costs and operational complexity.

Structures such as rocky formations with cavities, damaged buildings, uneven landscapes used for mining or agricultural purposes, and archaeological sites often present surfaces with varying elevations, orientations, and accessibility characteristics. Evaluating such structures may benefit from inspection approaches that can adapt to different surface geometries and access requirements while maintaining consistency in the collected data.

Therefore, improvements in GPR inspection systems that address the limitations of existing ground-based and aerial approaches are desirable.

The present disclosure seeks to overcome one or more of the aforementioned problems. More particularly, but not exclusively, the present disclosure seeks to provide an improved GPR inspection system.

SUMMARY

There is provided according to a first aspect of the present disclosure, a Ground Penetrating Radar (GPR) inspection system. The system comprises an autonomous vehicle module configured for ground-based navigation. The system further comprises an unmanned aerial vehicle module configured for aerial flight. The system also comprises a GPR module comprising a detachable GPR inspection platform housing a GPR antenna. The GPR module is switchable between a first operational mode in which the detachable GPR inspection platform is mounted on the autonomous vehicle module for GPR inspection from a ground mounted position, and a second operational mode in which the detachable GPR inspection platform is mounted on the unmanned aerial vehicle module for GPR inspection from an aerial mounted position. The GPR module includes an automated attachment mechanism configured to selectively secure the detachable GPR inspection platform to either the autonomous vehicle module or the unmanned aerial vehicle module.

The hybrid configuration of the system enables utilization of the same GPR antenna for both ground-based and aerial inspection operations, which reduces equipment costs and mitigates distortions in collected radargrams that would otherwise result from using different antennas with varying characteristics. The switchable nature of the GPR module provides operational flexibility to evaluate structures with varying geometric shapes and altitudes, including ground level surfaces as well as vertical structures or areas accessible by drones.

The GPR inspection system may comprise one or more of the following features. The automated attachment mechanism may comprise a first attachment mechanism configured to secure the detachable GPR inspection platform to the autonomous vehicle module, and a second attachment mechanism configured to secure the detachable GPR inspection platform to the unmanned aerial vehicle module.

The provision of separate first and second attachment mechanisms enables the detachable GPR inspection platform to interface with both ground-based and aerial platforms through dedicated securing arrangements, facilitating reliable transitions between operational modes.

The first attachment mechanism may comprise at least one pressure sensor and at least one servo motor.

The at least one servo motor may be configured to rotate to secure platform legs of the detachable GPR inspection platform to the autonomous vehicle module in response to the at least one pressure sensor detecting contact with the platform legs.

The pressure sensor and servo motor arrangement provides an automated securing mechanism that responds to physical contact, enabling hands-free attachment of the GPR inspection platform to the ground vehicle without manual intervention.

The second attachment mechanism may comprise at least one pressure sensor positioned on a top surface of the detachable GPR inspection platform and a servo motor configured to rotate to secure a drone attachment platform of the unmanned aerial vehicle module to the detachable GPR inspection platform in response to the at least one pressure sensor detecting contact with the drone attachment platform.

The positioning of pressure sensors on the top surface of the detachable GPR inspection platform enables automated detection of the drone attachment platform during aerial docking operations, facilitating reliable attachment for airborne inspection.

The unmanned aerial vehicle module may comprise a downward facing camera configured to facilitate alignment between the unmanned aerial vehicle module and the detachable GPR inspection platform during transition between the first operational mode and the second operational mode The unmanned aerial vehicle module may comprise a drone attachment platform.

The drone attachment platform may comprise a downward facing camera configured to facilitate alignment between the unmanned aerial vehicle module and the detachable GPR inspection platform during transition between the first operational mode and the second operational mode.

The downward facing camera provides visual feedback for alignment operations, enabling an operator to remotely guide the unmanned aerial vehicle into position for attachment with the detachable GPR inspection platform.

The system may comprise a data processing circuit configured to execute an artificial intelligence-driven computer vision algorithm to calculate spatial adjustments required for the unmanned aerial vehicle module to achieve alignment with the detachable GPR inspection platform based on video feed from the downward facing camera.

The artificial intelligence-driven computer vision algorithm enables automated alignment between the unmanned aerial vehicle and the detachable GPR inspection platform, reducing operator workload and improving alignment precision during mode transitions.

The GPR module may further comprise an antenna positioning mechanism configured to adjust at least one of an altitude and a tilt angle of the GPR antenna.

The antenna positioning mechanism enables dynamic adjustment of the GPR antenna position relative to inspected surfaces, allowing the system to maintain optimal proximity for improved imaging performance across surfaces with varying geometric characteristics.

The antenna positioning mechanism may comprise a telescopic mechanism comprising a plurality of telescopic sections configured to adjust the altitude of the GPR antenna, and a servo motor configured to adjust the tilt angle of the GPR antenna.

The combination of telescopic altitude adjustment and servo-controlled tilt adjustment provides multi-axis positioning capability for the GPR antenna, enabling inspection of both horizontal and vertical surfaces at varying distances.

The system may comprise a depth camera configured to capture depth information of an inspected surface, and a data processing circuit configured to automatically adjust the at least one of the altitude and the tilt angle of the GPR antenna based on the depth information captured by the depth camera.

The depth camera and associated data processing circuit enable real-time surface analysis and automatic antenna positioning, allowing the system to adapt to terrain variations while maintaining optimal antenna-to-surface proximity without collision.

The autonomous vehicle module may comprise a GPS module configured to provide positioning data for navigation along a preset inspection path, and at least one collision avoidance sensor configured to detect obstacles during ground-based navigation.

The GPS module and collision avoidance sensors enable autonomous navigation of the ground vehicle along predetermined inspection paths while avoiding obstacles, reducing operator intervention and enabling systematic coverage of inspection areas.

The detachable GPR inspection platform may comprise a data processing circuit, a wireless transceiver circuit, and a battery. The data processing circuit may be configured to control the automated attachment mechanism and to communicate with an operator via the wireless transceiver circuit.

The integrated data processing circuit, wireless transceiver circuit, and battery provide self-contained control and communication capabilities for the detachable GPR inspection platform, enabling remote operation and coordination with both ground and aerial platforms.

According to a second aspect of the present disclosure there is provided a method for performing Ground Penetrating Radar (GPR) inspection. The method comprises performing a first GPR inspection operation using a GPR antenna mounted on a detachable GPR inspection platform attached to an autonomous ground vehicle. The method further comprises initiating a transition from a ground-based inspection mode to an aerial inspection mode by aligning an unmanned aerial vehicle with the autonomous ground vehicle. The method also comprises detaching the detachable GPR inspection platform from the autonomous ground vehicle using an automated detachment mechanism. The method additionally comprises attaching the detachable GPR inspection platform to the unmanned aerial vehicle using an automated attachment mechanism. The method further comprises performing a second GPR inspection operation using the same GPR antenna while the detachable GPR inspection platform is mounted on the unmanned aerial vehicle.

The method enables comprehensive inspection of structures having both ground-accessible and aerial-accessible surfaces using a single GPR antenna, providing data consistency across different inspection modes and reducing the need for multiple specialized inspection systems.

The method may include one or more of the following features. Aligning the unmanned aerial vehicle with the autonomous ground vehicle may comprise capturing video feed from a downward facing camera mounted on the unmanned aerial vehicle and transmitting the video feed to an operator for remote-controlled alignment.

The video feed transmission enables an operator to visually guide the alignment process from a remote location, providing situational awareness during the transition between operational modes.

Aligning the unmanned aerial vehicle with the autonomous ground vehicle may comprise processing the video feed from the downward facing camera using an artificial intelligence-driven computer vision algorithm to calculate spatial adjustments required for the unmanned aerial vehicle to achieve alignment with the detachable GPR inspection platform.

The artificial intelligence-driven processing of video feed enables automated calculation of alignment adjustments, reducing reliance on operator skill and improving repeatability of the attachment process.

The method may comprise adjusting at least one of an altitude and a tilt angle of the GPR antenna based on depth information of an inspected surface captured by a depth camera mounted on the detachable GPR inspection platform.

The depth-based antenna adjustment enables the system to adapt to surface geometry variations during inspection, maintaining optimal antenna positioning for improved imaging resolution across uneven or complex surfaces.

The automated attachment mechanism may comprise activating at least one pressure sensor to detect contact between a drone attachment platform of the unmanned aerial vehicle and the detachable GPR inspection platform, and rotating a servo motor to secure the drone attachment platform to the detachable GPR inspection platform in response to the at least one pressure sensor detecting the contact.

The pressure sensor activation and servo motor rotation provide a reliable automated securing sequence that confirms physical contact before engaging the locking mechanism, reducing the risk of incomplete attachment.

According to a third aspect of the present disclosure there is provided a detachable GPR inspection platform for a hybrid ground and aerial GPR inspection system. The platform comprises a housing configured to contain a GPR antenna. The platform further comprises a first attachment interface disposed on a lower portion of the housing and configured to engage with an autonomous ground vehicle through a first automated attachment mechanism comprising a first set of pressure sensors and a first servo motor. The platform also comprises a second attachment interface disposed on an upper portion of the housing and configured to engage with a drone attachment platform through a second automated attachment mechanism comprising a second set of pressure sensors and a second servo motor. The platform additionally comprises a data processing and control circuit in communication with the first set of pressure sensors, the second set of pressure sensors, the first servo motor, and the second servo motor. The platform further comprises a telescopic height adjustment mechanism coupled to the GPR antenna and configured to adjust a vertical position of the GPR antenna relative to the housing.

The detachable GPR inspection platform provides a modular component that can interface with both ground and aerial platforms through dedicated attachment interfaces, enabling a single GPR antenna to be utilized across multiple inspection configurations while providing height adjustment capability for optimal antenna positioning.

The detachable GPR inspection platform may include one or more of the following features. The platform may comprise a depth camera configured to capture depth information of an inspected surface. The data processing and control circuit may be configured to automatically adjust the vertical position of the GPR antenna based on the depth information captured by the depth camera.

The depth camera integration enables surface-aware antenna positioning, allowing the platform to maintain appropriate separation from inspected surfaces based on real-time depth measurements.

The platform may further comprise a servo motor coupled to the GPR antenna and configured to adjust a tilt angle of the GPR antenna. The data processing and control circuit may be configured to automatically adjust the tilt angle based on the depth information captured by the depth camera.

The servo motor-controlled tilt adjustment enables the GPR antenna to be oriented toward surfaces at various angles, expanding the range of surface geometries that can be effectively inspected.

The platform may comprise a wireless transceiver circuit in communication with the data processing and control circuit. The wireless transceiver circuit may be configured to receive remote control signals from an operator for controlling the first servo motor, the second servo motor, and the telescopic height adjustment mechanism.

The wireless transceiver circuit enables remote operator control of the attachment mechanisms and antenna positioning, providing operational flexibility for both automated and manually-directed inspection operations.

The person skilled in the art will appreciate that features disclosed in relation to one aspect of the present disclosure may be applicable to other aspects of the present disclosure and vice versa.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

Figure 1:
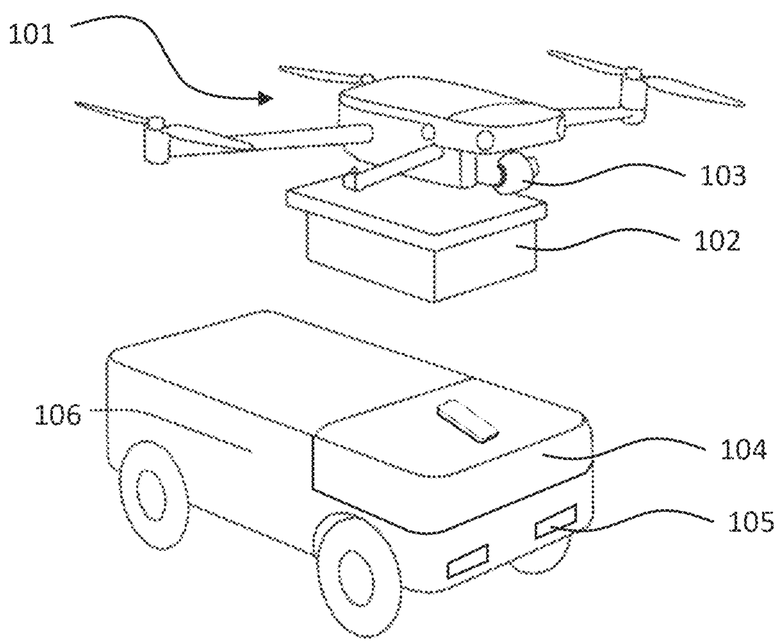
FIG. 1 shows an isometric view of a hybrid ground and drone mounted GPR inspection system according to an embodiment of the present disclosure.

The foregoing and other objects, features and advantages of the present invention, as well as the invention itself, will be more fully understood from the following description of preferred embodiments, when read together with the accompanying drawings.

DETAILED DESCRIPTION

The present disclosure relates to a hybrid Ground Penetrating Radar (GPR) inspection system configured to perform both ground-based and drone-based GPR imaging. The hybrid GPR inspection system may comprise three main components: an autonomous ground inspection vehicle, a detachable GPR inspection platform, and a drone attachment platform. In some cases, the detachable GPR inspection platform houses a GPR antenna and is configured to attach to either the autonomous ground inspection vehicle for ground-based inspection operations or to the drone attachment platform for airborne inspection operations.

The principles of the present invention and their advantages are best understood by referring t FIG. 1 to FIG. 13. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

The hybrid GPR inspection system may utilize the same GPR antenna for both ground-based and drone-based inspection modes. By employing a single GPR antenna across both operational configurations, the system may mitigate readings distortion that can result from using different antennas with varying characteristics. In some cases, radargrams collected during ground-based inspection and radargrams collected during drone-based inspection are obtained using the same antenna, which may provide improved evaluation accuracy and reduced costs compared to systems that employ separate antennas for different inspection modes.

The hybrid GPR inspection system may include automated mechanisms that enable switching between the ground-based operational mode and the drone-based operational mode. In some cases, the automated mechanisms facilitate attachment and detachment of the detachable GPR inspection platform from the autonomous ground inspection vehicle and attachment and detachment of the detachable GPR inspection platform to the drone attachment platform. The automated mechanisms may operate in response to sensor inputs and control signals, enabling the transition between operational modes without manual intervention. In some cases, the system operates in a remotely controlled mode where an operator provides control instructions for the switching process, while in other cases, the system operates in a fully automated mode where artificial intelligence-driven algorithms control the switching process.

Figure 2:
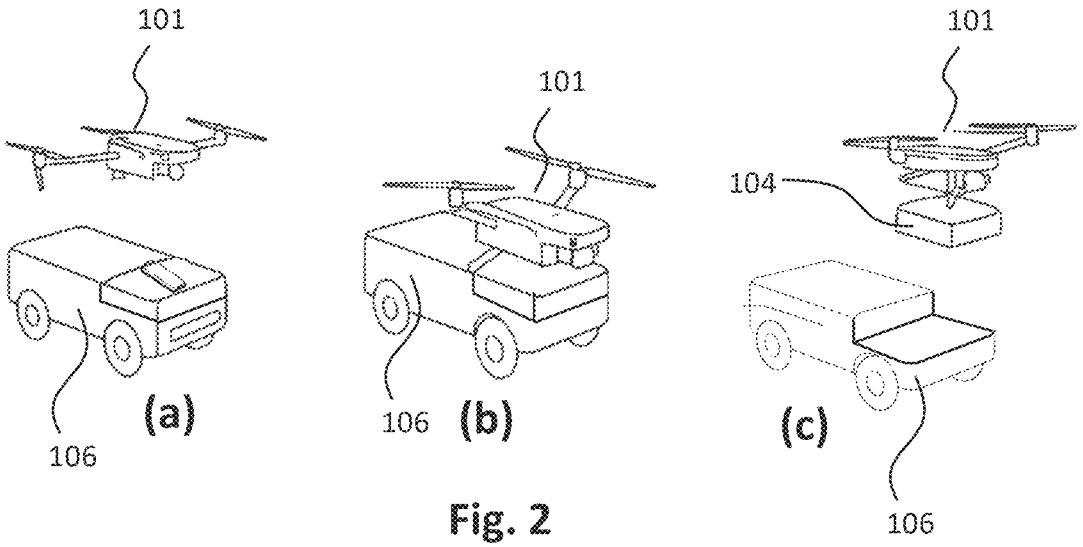
FIG. 2 shows an isometric view of the hybrid ground and drone mounted GPR inspection system of FIG. 1 according to an embodiment of the present disclosure.

Referring to FIGS. 1-2, the hybrid GPR inspection system may include a drone 101, a drone attachment platform 102, a downward facing camera 103, a detachable GPR inspection platform 104, a collision avoidance sensor 105, and an autonomous ground inspection vehicle 106. The drone 101 may be positioned above the autonomous ground inspection vehicle 106 during transition between operational modes. The drone attachment platform 102 may be mounted to the drone 101 and configured to interface with the detachable GPR inspection platform 104 for airborne inspection operations.

The downward facing camera 103 may be mounted on the drone attachment platform 102 and configured to capture video feed directed toward the autonomous ground inspection vehicle 106. In embodiments, the downwards facing camera 103 is mounted on the drone 101 (which may also be termed as an unmanned aerial vehicle (UAV)). In some cases, the downward facing camera 103 facilitates alignment between the drone 101 and the autonomous ground inspection vehicle 106 during the transition from ground-based inspection mode to airborne inspection mode. The video feed from the downward facing camera 103 may be transmitted to an operator for remote-controlled alignment or may be processed by artificial intelligence-driven computer vision algorithms for automated alignment.

With continued reference to FIGS. 1-2, the detachable GPR inspection platform 104 may be mounted on top of the autonomous ground inspection vehicle 106 during ground-based inspection operations. The detachable GPR inspection platform 104 houses a GPR antenna and is configured to attach to either the autonomous ground inspection vehicle 106 or the drone attachment platform 102. In embodiments, the detachable GPR inspection platform 104 includes automated attachment mechanisms that enable selective connection to the autonomous ground inspection vehicle 106 for ground-based inspection or to the drone attachment platform 102 for airborne inspection. The dual-mode configuration of the detachable GPR inspection platform 104 enables the same GPR antenna to be utilized for inspection of ground level surfaces as well as vertical structures or areas accessible by drones.

The autonomous ground inspection vehicle 106 may include a housing structure configured to accommodate the detachable GPR inspection platform 104 and wheels for ground mobility. In some cases, the autonomous ground inspection vehicle 106 navigates through a preset inspection path using positioning data from a GPS module and obstacle detection data from sensors. The collision avoidance sensor 105 may be positioned on an exterior surface of the autonomous ground inspection vehicle 106 and configured to detect obstacles and prevent collisions during navigation. The collision avoidance sensor 105 may be implemented as a depth camera, an infrared sensor, a laser sensor, or an ultrasonic sensor for obstacle detection and distance measuring. In some cases, multiple collision avoidance sensors 105 are positioned at different locations on the autonomous ground inspection vehicle 106 to provide comprehensive obstacle detection coverage during ground-based navigation.

FIG. 2(*a*) shows the drone 101 approaching the ground inspection vehicle while the ground inspection vehicle is in a first operational mode where the GPR inspection platform is mounted on the autonomous vehicle module for GPR inspection from a ground mounted position.

In FIG. 2(*b*), the drone 101 is attaching to the GPR inspection platform while the GPR inspection platform is detaching from the autonomous vehicle module 106, in a switching operational mode.

In FIG. 2(*c*), the GPR inspection platform is detached from the autonomous vehicle module and is attached to the drone 101 in a second operational mode in which the detachable GPR inspection platform is mounted on the unmanned aerial vehicle for GPR inspection from an aerial mounted position.

Figure 3:
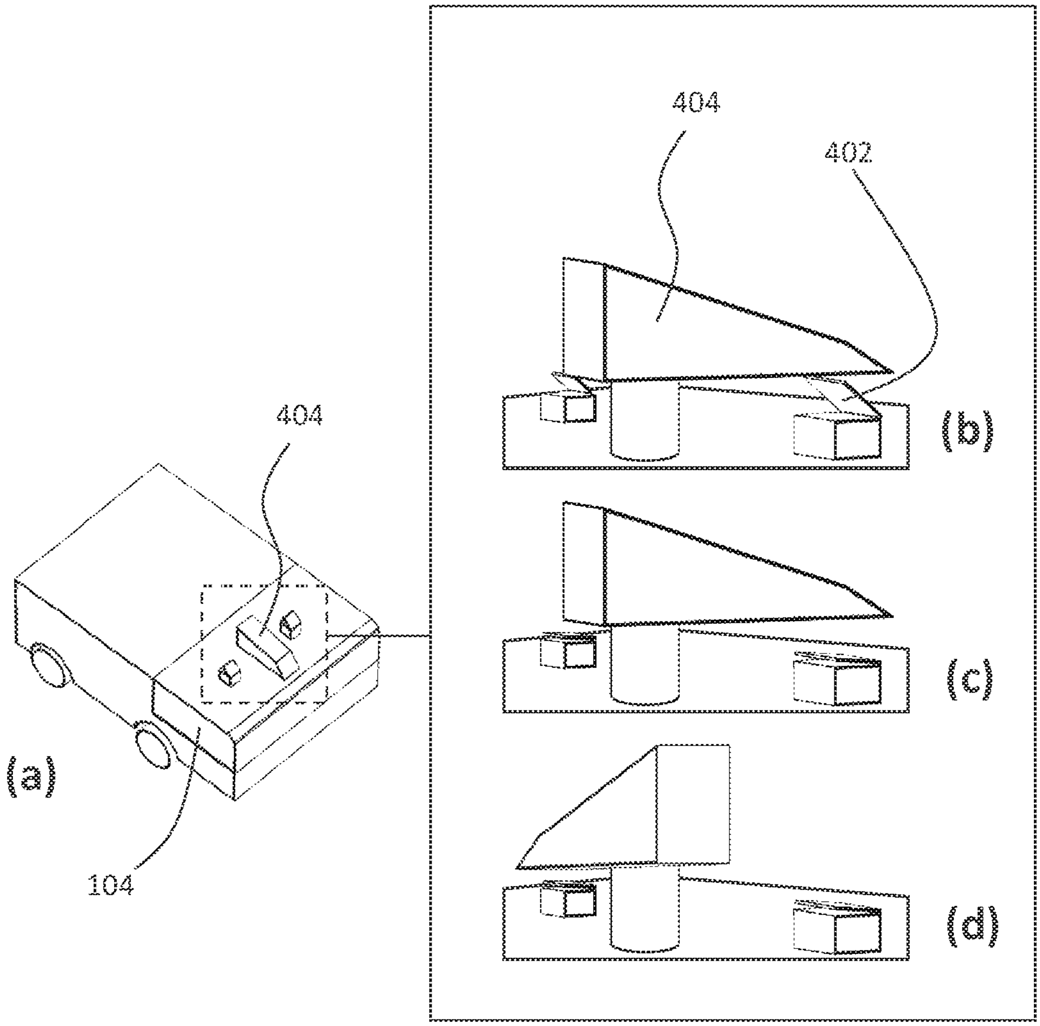
FIG. 3 shows an isometric view of a detachable GPR inspection platform and a drone attachment mechanism according to an embodiment of the present disclosure.

Referring to FIG. 3, the detachable GPR inspection platform may include an automated attachment mechanism configured to secure the detachable GPR inspection platform to the drone attachment platform. The automated attachment mechanism may comprise pressure sensors 402 and a servo motor 404 that operate in a coordinated sequence to establish a secured mechanical connection between the detachable GPR inspection platform and the drone attachment platform.

The detachable GPR inspection platform may have two pressure sensors 402 positioned on a top surface of the detachable GPR inspection platform 104. The two pressure sensors may be configured to detect contact with the drone attachment platform when the drone attachment platform descends and engages with the detachable GPR inspection platform. In some cases, the two pressure sensors are arranged in a spaced configuration on the top surface to provide reliable detection of the drone attachment platform across a range of alignment positions.

With continued reference to FIG. 3, the automated attachment mechanism may include a servo motor 404 having an upper servo motor head. In a stationary position, the upper servo motor head may be oriented in a first rotational position (FIG. 3(*b*)) that permits the drone attachment platform to approach and contact the detachable GPR inspection platform. The stationary position of the upper servo motor head corresponds to an unlocked state of the automated attachment mechanism.

When the drone attachment platform descends toward the detachable GPR inspection platform, the drone attachment platform may push the pressure sensors downward (FIG. 3(*c*)). The downward displacement of the pressure sensors generates a signal that is transmitted to a data processing and control circuit. In some cases, the data processing and control circuit receives the signal from the pressure sensors and determines that the drone attachment platform has made contact with the detachable GPR inspection platform.

In response to receiving the signal from the pressure sensors, the data processing and control circuit may send a control signal to the servo motor. The control signal instructs the servo motor to rotate the upper servo motor head. The servo motor may rotate by 90 degrees in response to the control signal, causing the upper servo motor head to transition from the stationary position to a locked position (FIG. 3(*d*)). The 90-degree rotation of the servo motor head secures the connection between the drone attachment platform and the detachable GPR inspection platform, thereby establishing a stable mechanical coupling that enables the drone to lift and carry the detachable GPR inspection platform during airborne inspection operations.

Figure 4:
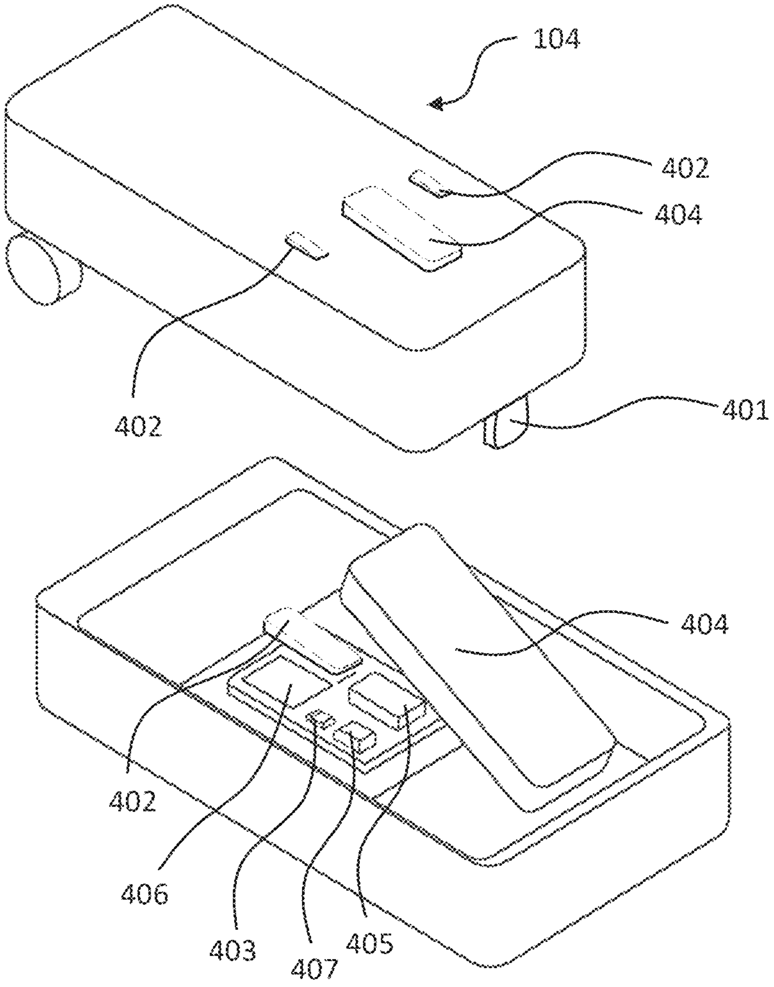
FIG. 4 shows a cutaway view of the detachable GPR inspection platform with processing and communication circuits according to an embodiment of the present disclosure.

Referring to FIG. 4, the detachable GPR inspection platform 104 may include processing and communication circuits that enable control of the automated attachment mechanism and facilitate data acquisition during inspection operations. FIG. 4 illustrates a cutaway view of the detachable GPR inspection platform 104 showing the arrangement of electronic components housed within the platform.

The detachable GPR inspection platform 104 may include a depth camera 401 positioned at one end of the platform. The depth camera 401 may be configured to capture live depth information of an inspected surface. In some cases, the depth camera 401 provides real-time depth data that enables spatial adjustments of the GPR antenna during inspection operations. The live depth information captured by the depth camera 401 may be transmitted to processing circuits within the detachable GPR inspection platform 104 for analysis and control signal generation.

With continued reference to FIG. 4, the detachable GPR inspection platform 104 may include pressure sensors 402 positioned on a top surface of the platform. The pressure sensors 402 may be configured to detect contact with the drone attachment platform 102 during the attachment process. When the drone attachment platform 102 descends and engages with the detachable GPR inspection platform 104, the pressure sensors 402 generate a signal indicating that contact has occurred.

The detachable GPR inspection platform 104 may include a Tx/Rx circuit 403 that enables wireless communication. The Tx/Rx circuit 403 may be configured to receive remote control signals from an operator and to transmit data to external devices. In some cases, the Tx/Rx circuit 403 facilitates communication between the detachable GPR inspection platform 104 and a remote operator for controlling attachment and detachment sequences.

As further shown in FIG. 4, the detachable GPR inspection platform 104 may include a servo motor 404 centrally located within the platform. The servo motor 404 may be configured to control a rotation mechanism that secures the connection between the detachable GPR inspection platform 104 and the drone attachment platform 102. In some cases, the servo motor 404 rotates by 90 degrees in response to a control signal to establish or release the mechanical connection with the drone attachment platform 102.

The detachable GPR inspection platform 104 may include a battery 405 that provides electrical power to the electronic components within the platform. The battery 405 may supply power to the depth camera 401, the Tx/Rx circuit 403, the servo motor 404, and other circuits housed within the detachable GPR inspection platform 104.

With continued reference to FIG. 4, the detachable GPR inspection platform 104 may include a data processing/control circuit 406 that receives signals from the pressure sensors 402 and controls the operation of the servo motor 404. The data processing/control circuit 406 may process the signal from the pressure sensors 402 to determine that the drone attachment platform 102 has made contact with the detachable GPR inspection platform 104. In response to detecting contact, the data processing/control circuit 406 may send a control signal to the servo motor 404 to rotate by 90 degrees, thereby securing the connection between the platforms. The data processing/control circuit 406 may also receive remote control signals via the Tx/Rx circuit 403 to initiate detachment sequences, wherein the data processing/control circuit 406 instructs the servo motor 404 to rotate in an opposite direction to release the drone attachment platform 102.

The detachable GPR inspection platform 104 may include a voltage regulator 407 that ensures stable power distribution to the various electronic components. The voltage regulator 407 may regulate the power supplied from the battery 405 to provide consistent voltage levels to the depth camera 401, the Tx/Rx circuit 403, the servo motor 404, and the data processing/control circuit 406. In some cases, the voltage regulator 407 protects the electronic components from voltage fluctuations that could affect circuit operation.

The interaction between the components within the detachable GPR inspection platform 104 may enable automated execution of attachment and detachment sequences. During an attachment sequence, the pressure sensors 402 detect contact with the drone attachment platform 102 and transmit a signal to the data processing/control circuit 406. The data processing/control circuit 406 processes the signal and sends a control signal to the servo motor 404 to rotate and secure the connection. During a detachment sequence, the Tx/Rx circuit 403 receives a remote control signal from an operator, and the data processing/control circuit 406 instructs the servo motor 404 to rotate in the opposite direction to release the drone attachment platform 102. The depth camera 401 captures live depth information of the inspected surface, enabling real-time spatial adjustments of the GPR antenna based on the surface characteristics detected during inspection operations.

Figure 5:
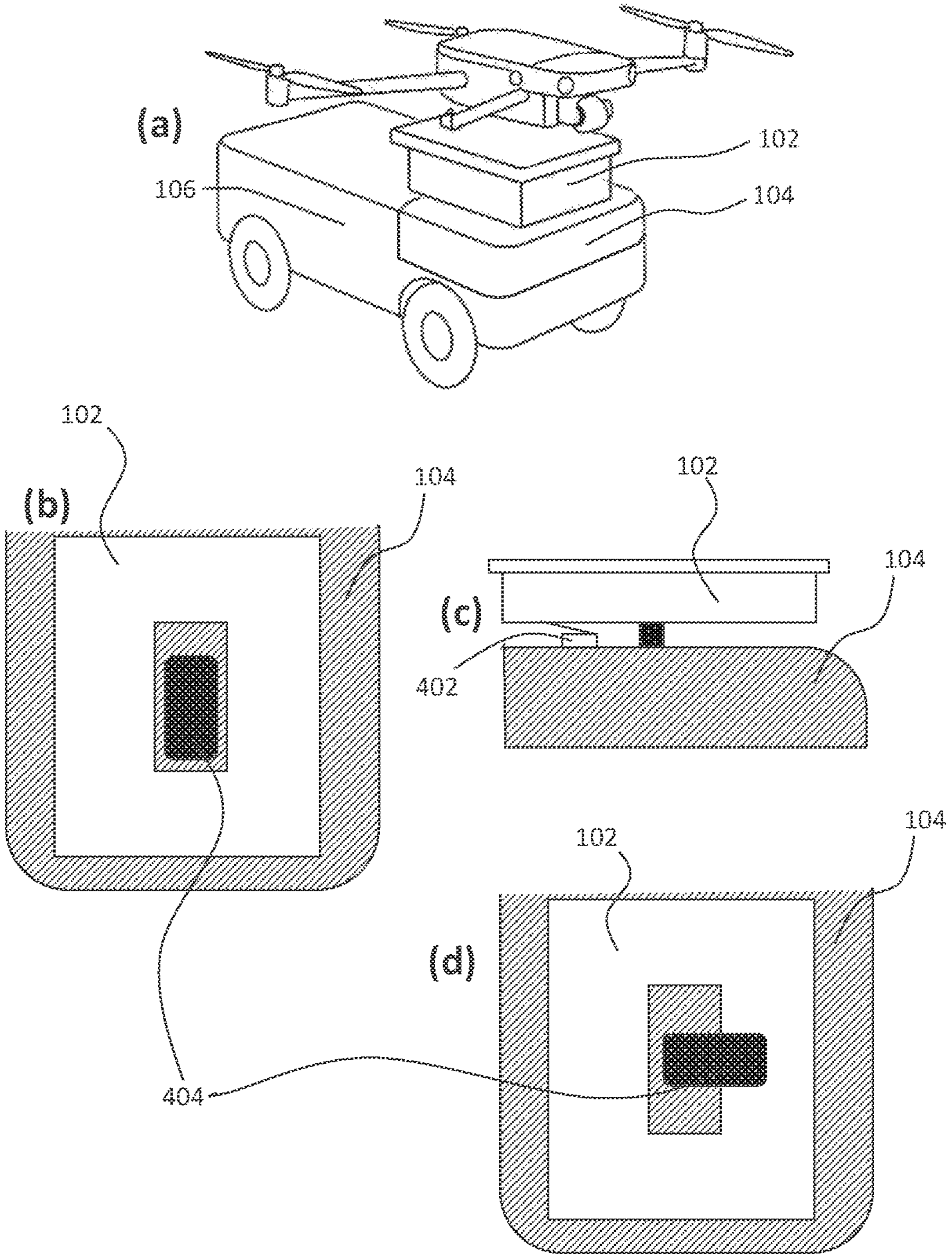
FIG. 5 shows an isometric view of an automated attachment process between the detachable GPR inspection platform and a drone attachment platform according to an embodiment of the present disclosure.

Referring to FIG. 5, the automated attachment process between the detachable GPR inspection platform 104 and the drone attachment platform 102 may proceed through a sequence of stages that enable transition from ground-based inspection mode to airborne inspection mode. FIG. 5 illustrates four sub-views labeled (a) through (d) that depict the sequential stages of the attachment mechanism.

In the first stage shown in sub-view (a), the autonomous ground inspection vehicle may be positioned with the detachable GPR inspection platform mounted on top. The ground vehicle may include a chassis with wheels for mobility, and the GPR inspection platform may be positioned above the ground vehicle. A drone may be shown hovering above the assembly, preparing for the attachment sequence. In some cases, the drone descends toward the ground vehicle while maintaining alignment with the detachable GPR inspection platform using video feed from a downward facing camera.

With continued reference to FIG. 5, sub-view (b) depicts the drone attachment platform coming into direct contact with the detachable GPR inspection platform. The drone attachment platform may descend and align with a top surface of the GPR inspection platform, initiating physical connection between the two components. In some cases, the alignment between the drone attachment platform and the detachable GPR inspection platform is facilitated by remote operator control or by artificial intelligence-driven computer vision algorithms that process video feed from the downward facing camera.

Sub-view (c) illustrates the stage where pressure sensors 402 on the detachable GPR inspection platform are pushed by the drone attachment platform. The contact between the drone attachment platform and the pressure sensors triggers a sensing mechanism that initiates an automated locking sequence. In some cases, the pressure sensors 402 generate a signal upon detecting the downward force applied by the drone attachment platform, and the signal is transmitted to a data processing and control circuit within the detachable GPR inspection platform.

As further shown in FIG. 5, sub-view (d) depicts the completed attachment process where a servo motor 404 has rotated 90 degrees in response to pressure sensor activation. The 90-degree rotation of the servo motor secures both platforms (102, 104) together, creating a stable connection that enables the detachable GPR inspection platform to be lifted and carried by the drone for airborne inspection operations. The secured mechanical coupling between the drone attachment platform and the detachable GPR inspection platform may withstand forces encountered during aerial flight and maneuvering.

The detachment process may be performed by receiving a remote signal from an operator through a Tx/Rx circuit. In some cases, the operator transmits a control signal via wireless communication to the Tx/Rx circuit within the detachable GPR inspection platform. Upon receiving the remote signal, a data processing and control circuit may process the signal and instruct the servo motor to rotate 90 degrees in an opposite direction from the locking rotation. The 90-degree rotation in the opposite direction releases the mechanical coupling between the drone attachment platform and the detachable GPR inspection platform, thereby detaching both platforms and enabling the detachable GPR inspection platform to be returned to the autonomous ground inspection vehicle for ground-based inspection operations.

Figure 6:
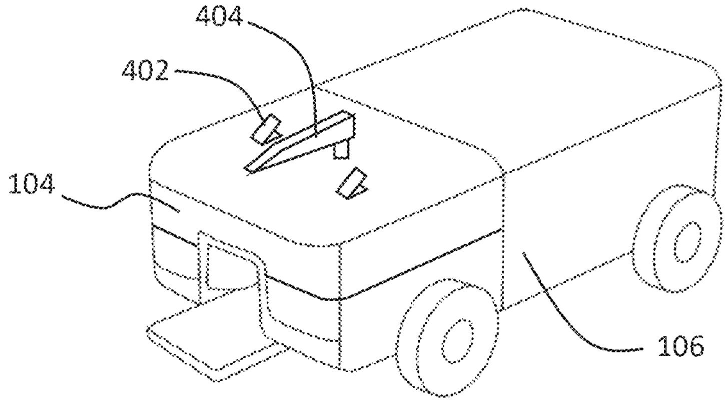
FIG. 6 shows an automated attachment mechanism between the detachable GPR inspection platform and an autonomous ground vehicle according to an embodiment of the present disclosure.
Figure 6:
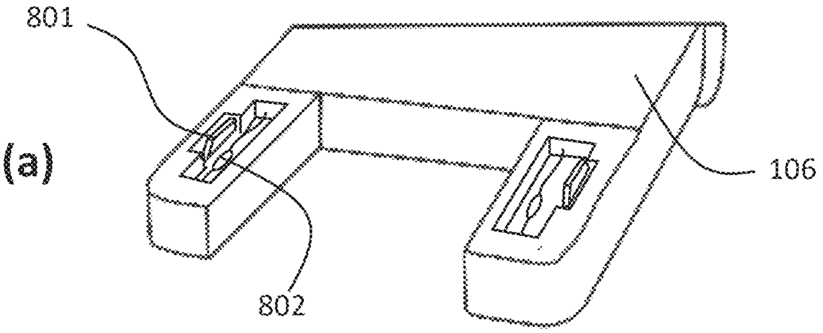
Figure 6:
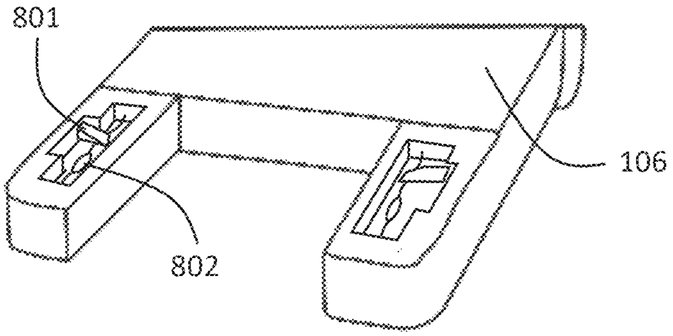

Referring to FIG. 6, the autonomous ground inspection vehicle 106 may include an automated attachment mechanism configured to secure the detachable GPR inspection platform 104 to the autonomous ground inspection vehicle 106. The automated attachment mechanism may comprise a servo motor 801 and a pressure sensor 802 that operate in a coordinated sequence to establish a secured mechanical connection between the detachable GPR inspection platform 104 and the autonomous ground inspection vehicle 106.

The automated attachment mechanism of the autonomous ground inspection vehicle 106 may include two pressure sensors 802 and two servo motors 801. The two pressure sensors 802 may be positioned within an attachment interface of the autonomous ground inspection vehicle 106 and configured to detect contact with platform legs of the detachable GPR inspection platform 104. The two servo motors 801 may be positioned adjacent to the two pressure sensors 802 within the attachment interface. In some cases, the two pressure sensors 802 and the two servo motors 801 are arranged in a paired configuration, with each servo motor 801 positioned proximate to a corresponding pressure sensor 802.

With continued reference to FIG. 6, view (a) illustrates the servo motors 801 in an initial position with the pressure sensors 802 in an unpressed state. In the initial position, the servo motors 801 may be oriented to permit the platform legs of the detachable GPR inspection platform 104 to approach and engage with the attachment interface of the autonomous ground inspection vehicle 106. The initial position of the servo motors 801 corresponds to an unlocked state of the automated attachment mechanism.

When the platform legs of the detachable GPR inspection platform 104 make contact with the pressure sensors 802, the pressure sensors 802 may generate a signal indicating that contact has occurred. The signal from the pressure sensors 802 may be transmitted to the data processing/control circuit within the autonomous ground inspection vehicle 106. In some cases, the data processing/control circuit receives the signal from the pressure sensors 802 and determines that the platform legs of the detachable GPR inspection platform 104 have engaged with the attachment interface.

As further shown in FIG. 6, view (b) illustrates the automated attachment mechanism in a secured state. In response to receiving the signal from the pressure sensors 802, the data processing/control circuit may send a control signal to the servo motors 801. The control signal instructs the servo motors 801 to rotate. The servo motors 801 may rotate by 90 degrees in response to the control signal, causing the servo motor heads to transition from the initial position to a locked position. The 90-degree rotation of the servo motors 801 secures the platform legs of the detachable GPR inspection platform 104 to the autonomous ground inspection vehicle 106, thereby establishing a stable mechanical coupling that maintains the detachable GPR inspection platform 104 in position during ground-based inspection operations.

The detachment process for releasing the detachable GPR inspection platform 104 from the autonomous ground inspection vehicle 106 may be initiated by a remote control signal. In some cases, an operator transmits a control signal via wireless communication to the Tx/Rx circuit connected to the data processing/control circuit within the autonomous ground inspection vehicle 106. Upon receiving the remote signal, the data processing/control circuit may process the signal and instruct the servo motors 801 to rotate 90 degrees in an opposite direction from the locking rotation. The 90-degree rotation in the opposite direction releases the platform legs of the detachable GPR inspection platform 104, thereby enabling the detachable GPR inspection platform 104 to be lifted by the drone 101 for transition to airborne inspection operations.

Figure 7:
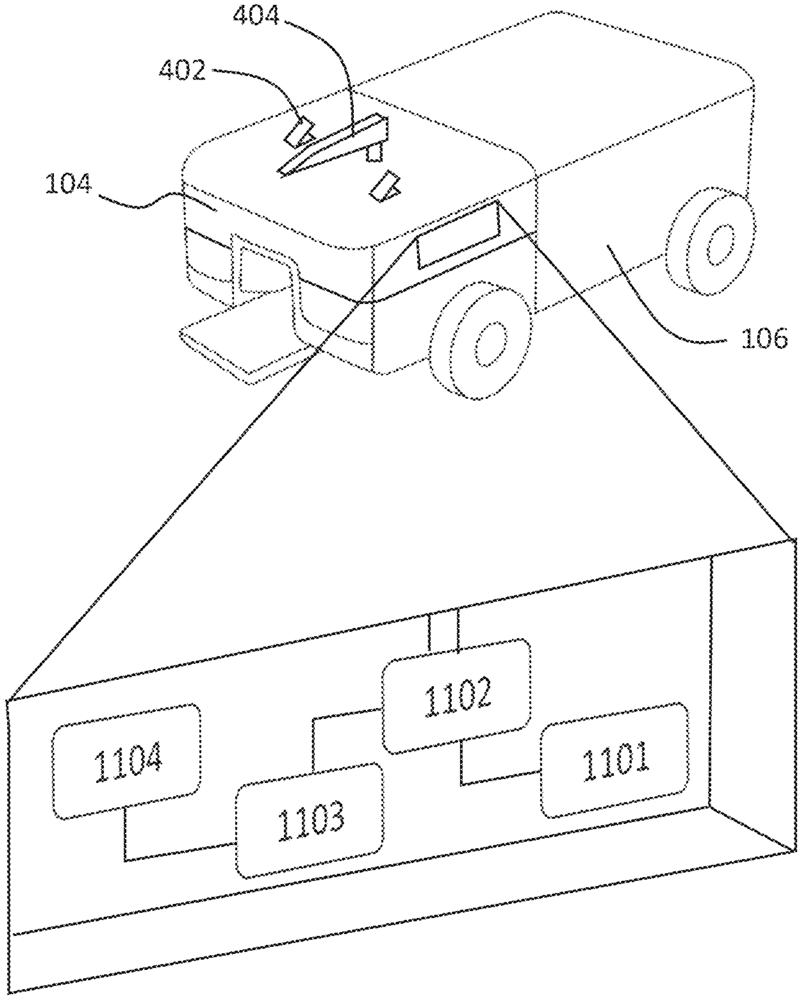
FIG. 7 shows a cutaway view of the detachable GPR inspection platform with antenna altitude and tilt adjustment circuits according to an embodiment of the present disclosure.

Referring to FIG. 7, the detachable GPR inspection platform 104 may include processing and communication circuits related to antenna altitude and tilt adjustment. FIG. 7 illustrates a cutaway view of the detachable GPR inspection platform 104 revealing an internal compartment that houses electronic components for controlling spatial positioning of the GPR antenna.

The detachable GPR inspection platform 104 may include a battery 1104 positioned within the internal compartment. The battery 1104 may provide electrical power to the various circuits within the detachable GPR inspection platform 104 that control antenna altitude and tilt adjustment operations. In some cases, the battery 1104 is positioned on one side of the internal compartment to facilitate efficient power distribution to adjacent electronic components.

With continued reference to FIG. 7, the detachable GPR inspection platform 104 may include a data processing/control circuit 1102 positioned adjacent to the battery 1104. The data processing/control circuit 1102 may process sensor data and control antenna altitude and tilt adjustments based on information received from the depth camera 401. In some cases, the data processing/control circuit 1102 utilizes artificial intelligence-driven computer vision algorithms to estimate spatial adjustments required for the GPR antenna to remain at closest proximity with the inspected surface without colliding with obstacles. The artificial intelligence-driven computer vision algorithms may analyze depth information captured by the depth camera 401 to determine surface variations and calculate appropriate altitude and tilt angle modifications for the GPR antenna.

The detachable GPR inspection platform 104 may include a Tx/Rx circuit 1101 positioned near the data processing/control circuit 1102. The Tx/Rx circuit 1101 may facilitate wireless communication for receiving remote control instructions from an operator and transmitting feedback data. In some cases, the Tx/Rx circuit 1101 receives control signals that specify manual adjustments to the antenna altitude or tilt angle when the system operates in a remotely controlled mode. The Tx/Rx circuit 1101 may also transmit status information and sensor data to external devices for monitoring inspection operations.

As further shown in FIG. 7, the detachable GPR inspection platform 104 may include a voltage regulator circuit 1103 positioned below the data processing/control circuit 1102. The voltage regulator circuit 1103 may regulate power supplied from the battery 1104 to ensure stable operation of the electronic components. In some cases, the voltage regulator circuit 1103 provides consistent voltage levels to the data processing/control circuit 1102, the Tx/Rx circuit 1101, and other circuits involved in antenna positioning control.

The data processing/control circuit 1102 may receive depth information from the depth camera 401 and process the depth information using the artificial intelligence-driven computer vision algorithms. The artificial intelligence-driven computer vision algorithms may analyze the depth variation of the inspected surface to estimate spatial adjustments that maintain the GPR antenna at an optimal distance from the surface while avoiding contact with obstacles or the surface itself. In some cases, the data processing/control circuit 1102 generates control signals based on the estimated spatial adjustments and transmits the control signals to the servo motor 602 and the telescopic mechanism to execute the altitude and tilt angle modifications.

Figure 8:
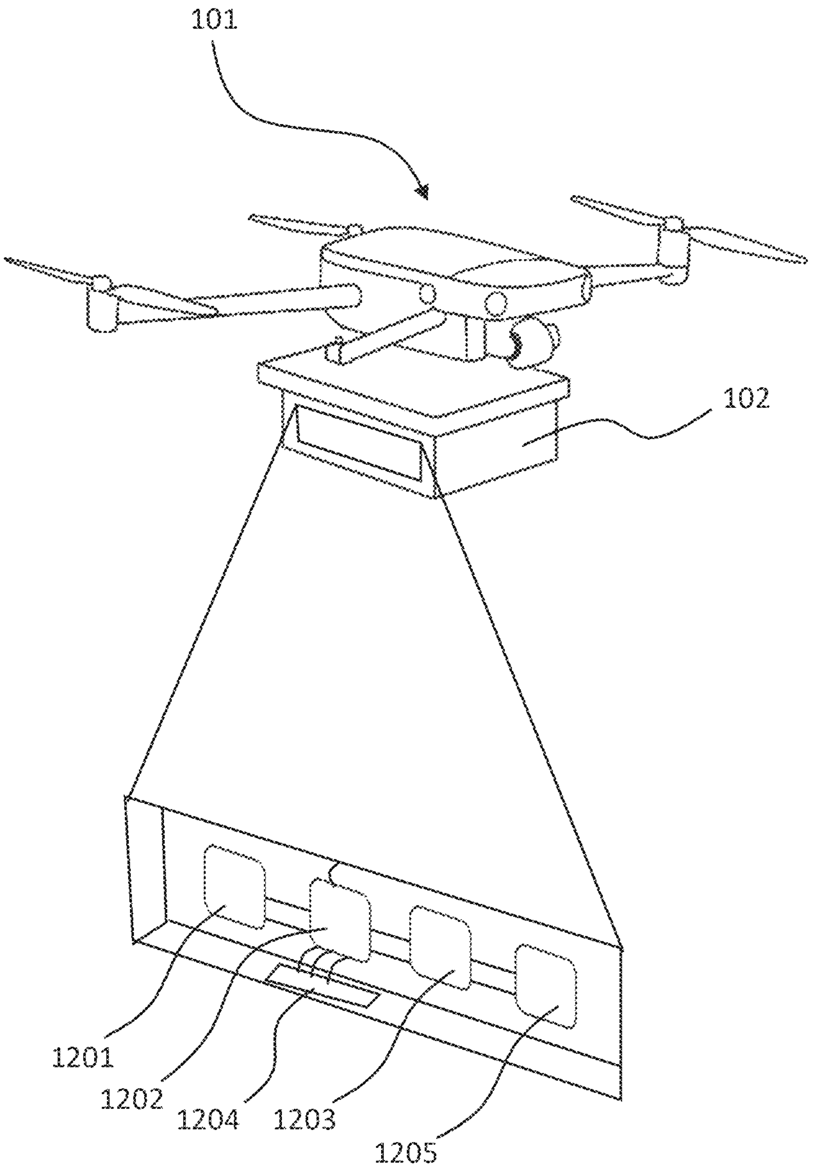
FIG. 8 shows processing and communication circuits of the drone attachment platform according to an embodiment of the present disclosure.

Referring to FIG. 8, the drone attachment platform 102 may include processing and communication circuits that enable control of the alignment process and facilitate communication during transition between operational modes. FIG. 8 illustrates the arrangement of electronic components housed within the drone attachment platform 102.

The drone attachment platform 102 may include a Tx/Rx circuit 1201 positioned at an upper portion of the assembly. The Tx/Rx circuit 1201 may facilitate wireless communication for transmitting and receiving control signals and data. In some cases, the Tx/Rx circuit 1201 transmits live video feed captured by the downward facing camera 1204 to an operator for remote-controlled alignment between the drone 101 and the autonomous ground inspection vehicle 106. The Tx/Rx circuit 1201 may also receive control instructions from the operator specifying spatial adjustments for the drone 101 during the alignment process.

With continued reference to FIG. 8, the drone attachment platform 102 may include a data processing/control circuit 1202 positioned below the Tx/Rx circuit 1201. The data processing/control circuit 1202 may process incoming data and generate control signals for system operations. In some cases, the data processing/control circuit 1202 utilizes artificial intelligence-driven computer vision algorithms to calculate spatial adjustments required for the drone 101 to achieve alignment with the detachable GPR inspection platform 104. The artificial intelligence-driven computer vision algorithms may analyze video feed from the downward facing camera 1204 to estimate the spatial adjustment needed by the drone 101 to achieve an exact alignment with the detachable GPR inspection platform 104.

The drone attachment platform 102 may include a voltage regulator 1203 positioned below the data processing/control circuit 1202. The voltage regulator 1203 may provide stable power distribution to the various electronic components within the drone attachment platform 102. In some cases, the voltage regulator 1203 regulates power supplied from the battery 1205 to ensure consistent voltage levels for the Tx/Rx circuit 1201, the data processing/control circuit 1202, and the downward facing camera 1204.

As further shown in FIG. 8, the drone attachment platform 102 may include a downward facing camera 1204 configured to capture live video feed directed toward the autonomous ground inspection vehicle 106 and the detachable GPR inspection platform 104. The downward facing camera 1204 may provide visual information that facilitates alignment between the drone attachment platform 102 and the detachable GPR inspection platform 104 during transition from ground-based inspection mode to airborne inspection mode.

The drone attachment platform 102 may include a battery 1205 located at a lower portion of the assembly. The battery 1205 may supply electrical power to the Tx/Rx circuit 1201, the data processing/control circuit 1202, the voltage regulator 1203, and the downward facing camera 1204. In some cases, the battery 1205 provides sufficient power capacity to support continuous operation of the electronic components during alignment and attachment sequences.

The alignment process between the drone 101 and the autonomous ground inspection vehicle 106 may be performed in a remotely controlled mode or in an automated mode. In the remotely controlled mode, the downward facing camera 1204 captures live video feed of the detachable GPR inspection platform 104 and the autonomous ground inspection vehicle 106. The live video feed may be transmitted via the Tx/Rx circuit 1201 to an operator at a remote location. The operator may view the live video feed and provide control instructions to adjust the position of the drone 101 to achieve alignment with the detachable GPR inspection platform 104.

In the automated mode, the live video feed from the downward facing camera 1204 may be fed directly to the data processing/control circuit 1202. The data processing/control circuit 1202 may utilize artificial intelligence-driven computer vision algorithms to analyze the video feed and calculate the spatial adjustments required for the drone 101 to be correctly aligned with the detachable GPR inspection platform 104. In some cases, the artificial intelligence-driven computer vision algorithms identify the position of the detachable GPR inspection platform 104 within the video feed and determine the directional and distance adjustments needed for the drone 101 to achieve exact alignment. The data processing/control circuit 1202 may generate control signals based on the calculated spatial adjustments and transmit the control signals to flight control systems of the drone 101 to execute the alignment maneuvers.

Figure 9:
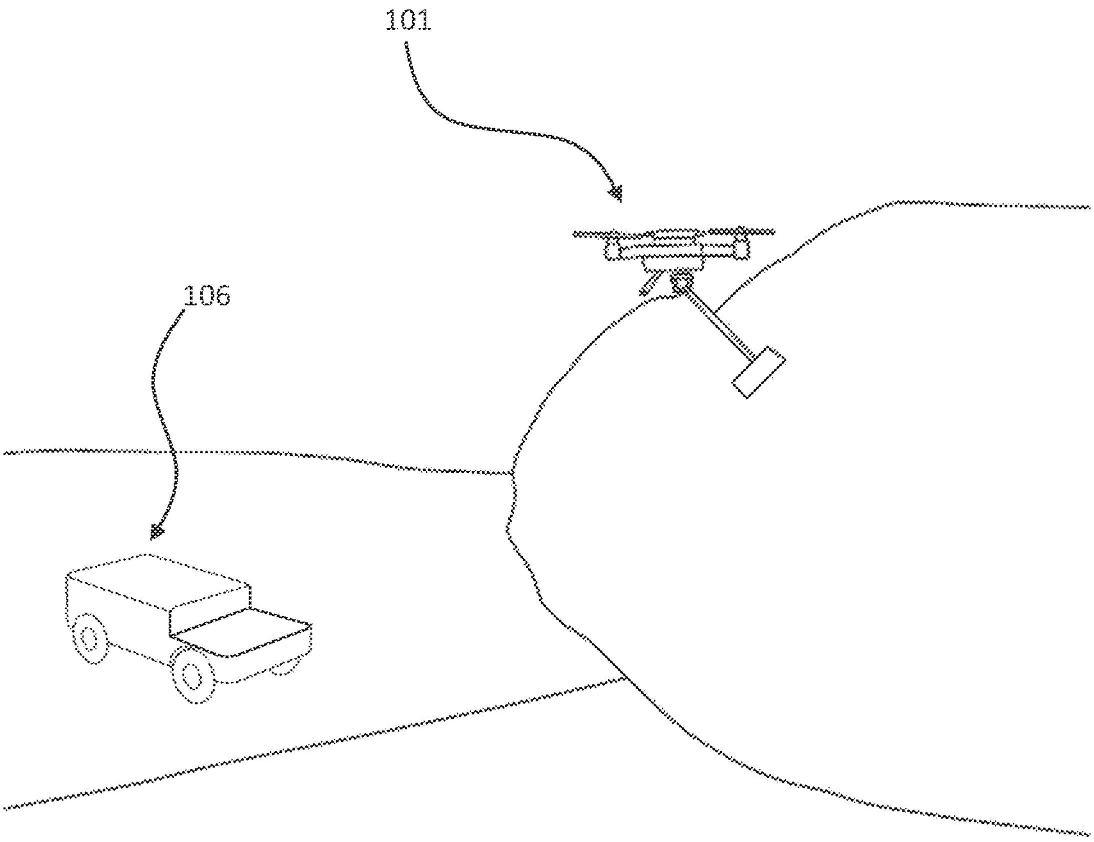
FIG. 9 shows a perspective view of a drone-mounted GPR inspection system operating in an outdoor environment according to an embodiment of the present disclosure.

Referring to FIG. 9, the hybrid GPR inspection system may operate in a drone-mounted configuration for inspection of vertical structures and elevated surfaces. FIG. 9 illustrates a perspective view of the drone-mounted GPR inspection system operating in an outdoor environment, with a drone hovering near a large rocky formation. The drone may be positioned adjacent to a vertical surface of the rock, with the detachable GPR inspection platform attached beneath the drone. The GPR antenna may extend from the detachable GPR inspection platform toward the rock surface, with the telescopic mechanism enabling altitude adjustment to maintain proximity to the inspected surface.

The drone-mounted configuration may enable inspection of surfaces that are inaccessible to ground-based GPR inspection methods. In some cases, the drone maneuvers the detachable GPR inspection platform to scan vertical faces of geological structures, building facades, or other elevated surfaces that cannot be reached by the autonomous ground inspection vehicle. The GPR antenna may be oriented to direct radar signals toward the vertical surface, enabling subsurface imaging of internal features within the structure being inspected.

With continued reference to FIG. 9, the hybrid GPR inspection system may be applied to inspection of rocky formations with cavities. The drone-mounted configuration enables the GPR antenna to be positioned adjacent to vertical or inclined rock surfaces, allowing detection of subsurface voids, fractures, or other geological features within the rock mass. In some cases, the depth camera captures surface geometry information that enables automatic adjustment of the GPR antenna altitude and tilt angle to maintain consistent proximity to irregular rock surfaces during scanning operations.

The hybrid GPR inspection system may be applied to inspection of demolished buildings during disaster response operations. In some cases, the drone-mounted configuration enables rapid deployment of GPR inspection capabilities to areas where ground access is obstructed by debris or structural collapse. The drone may navigate around and above damaged structures, positioning the GPR antenna to scan rubble piles or partially collapsed walls for detection of voids, buried objects, or structural anomalies. The aerial mobility of the drone-mounted configuration may enable inspection of multiple locations within a disaster site without requiring ground vehicle access.

The hybrid GPR inspection system may be applied to inspection of uneven landscapes for mining or agricultural purposes. In some cases, the drone-mounted configuration enables GPR inspection of terrain with significant elevation changes, slopes, or surface irregularities that would impede ground-based inspection vehicles. The telescopic mechanism and tilt adjustment capabilities of the detachable GPR inspection platform may enable the GPR antenna to maintain appropriate positioning relative to undulating ground surfaces during aerial scanning operations. The system may be utilized to detect subsurface features relevant to mining exploration or to assess soil conditions for agricultural applications.

The hybrid GPR inspection system may be applied to inspection of complex archeological sites. In some cases, the drone-mounted configuration enables non-invasive subsurface imaging of archeological features located on elevated terrain, hillsides, or areas with limited ground access. The aerial mobility of the drone may enable systematic scanning of large site areas while the GPR antenna captures subsurface data for detection of buried structures, artifacts, or other archeological features. The ability to utilize the same GPR antenna for both ground-based and drone-based inspection may enable comprehensive site surveys that combine data from multiple inspection modes.

Figure 10:
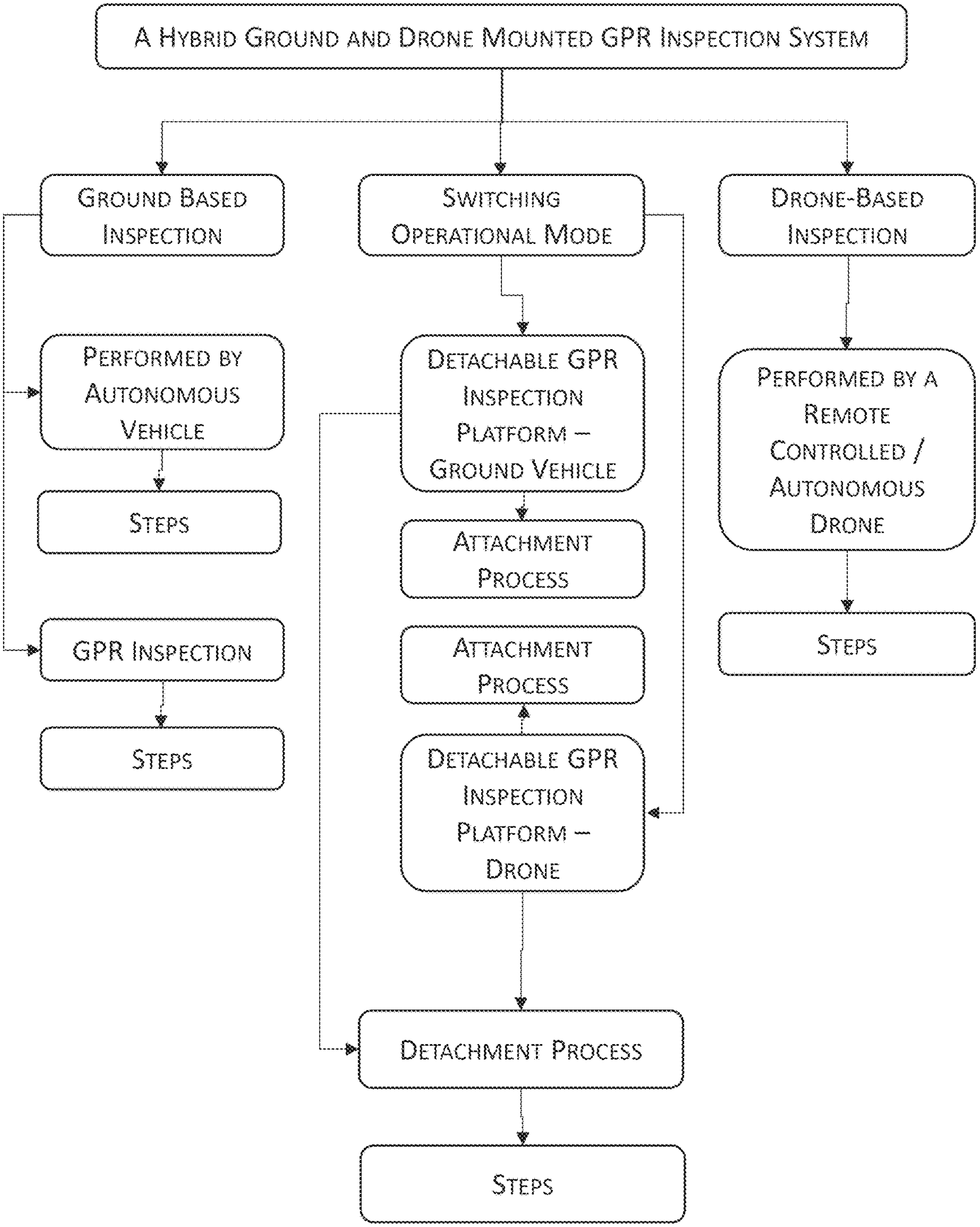
FIG. 10 shows a flowchart for a hybrid ground and drone mounted GPR inspection system workflow according to an embodiment of the present disclosure.

Referring to FIG. 10, the hybrid GPR inspection system may operate according to a workflow that encompasses three primary operational paths: ground-based inspection, switching operational mode, and drone-based inspection. FIG. 10 illustrates a flowchart depicting the operational modes and processes involved in transitioning between ground-based and drone-based GPR inspection configurations.

The ground-based inspection path may involve inspection performed by the autonomous ground inspection vehicle.

The autonomous ground inspection vehicle may navigate through a preset path by analyzing Global Positioning System (GPS) signals obtained through a built-in GPS module. In some cases, the GPS module provides positioning data that enables the autonomous ground inspection vehicle to follow a predetermined inspection route. The autonomous ground inspection vehicle may also utilize obstacle avoidance sensors that provide navigation data to a data processing and control circuit. The data processing and control circuit may adjust the speed and direction of the autonomous ground inspection vehicle such that the vehicle satisfies the preset inspection path while avoiding collisions with detected obstacles.

With continued reference to FIG. 10, the autonomous ground inspection vehicle may be equipped with an automated attachment and detachment mechanism that pairs with the detachable GPR inspection platform. The GPR inspection equipment may be mounted on the detachable GPR inspection platform, where a GPR antenna altitude is controlled by a telescopic mechanism and an antenna tilt degree is controlled by a servo motor. In some cases, the telescopic mechanism and servo motor enable dynamic adjustment of the GPR antenna position during ground-based inspection operations.

The switching operational mode section of the flowchart may describe attachment and detachment processes for both the ground vehicle and drone configurations. For the ground vehicle attachment process, pressure sensors located on the ground vehicle may detect the presence of platform legs of the detachable GPR inspection platform. When the platform legs touch the pressure sensors, a signal may be sent to a data processing and control circuit. The data processing and control circuit may send a signal to servo motors to rotate 90 degrees, thereby securing the platform legs to the ground vehicle.

As further shown in FIG. 10, for the drone attachment process, pressure sensors located at a top of the detachable GPR inspection platform may detect the presence of a drone attachment platform. When the drone attachment platform touches the pressure sensors, a signal may be sent to a data processing and control circuit. The data processing and control circuit may send a signal to a servo motor to rotate 90 degrees, thereby securing the detachable GPR inspection platform to the drone attachment platform. A downward facing camera in the drone attachment platform may facilitate a remotely controlled or automated alignment process between the drone and the ground vehicle.

The detachment process may involve a signal remotely sent by an operator through a Tx/Rx module. In some cases, the data processing and control circuit receives the remote signal and sends a signal to the servo motors to rotate 90 degrees in an opposite direction, thereby releasing the platform legs from the ground vehicle or releasing the drone attachment platform from the detachable GPR inspection platform.

With continued reference to FIG. 10, the drone-based inspection path may involve inspection performed by a remote controlled or autonomous drone. The drone may have an attachment platform at a bottom that enables pairing with the detachable GPR inspection platform. The detachable GPR inspection platform may have a depth camera that facilitates performing remotely controlled or automated drone-mounted GPR inspection. In some cases, the depth camera captures surface information that enables real-time spatial adjustments of the GPR antenna during aerial inspection operations.

The system may enable adjusting a spatial position of the GPR antenna, including altitude and tilt, using automated or remotely controlled modes. In the automated mode, a data processing and control circuit may analyze depth information captured by the depth camera and utilize artificial intelligence-driven computer vision algorithms to calculate spatial adjustments for the GPR antenna. In the remotely controlled mode, an operator may provide control instructions via wireless communication to adjust the altitude and tilt angle of the GPR antenna based on video feed from the depth camera. The telescopic mechanism may extend or retract to adjust the vertical altitude of the GPR antenna, while the servo motor may rotate to adjust the tilt angle of the GPR antenna relative to the inspected surface.

Figure 11:
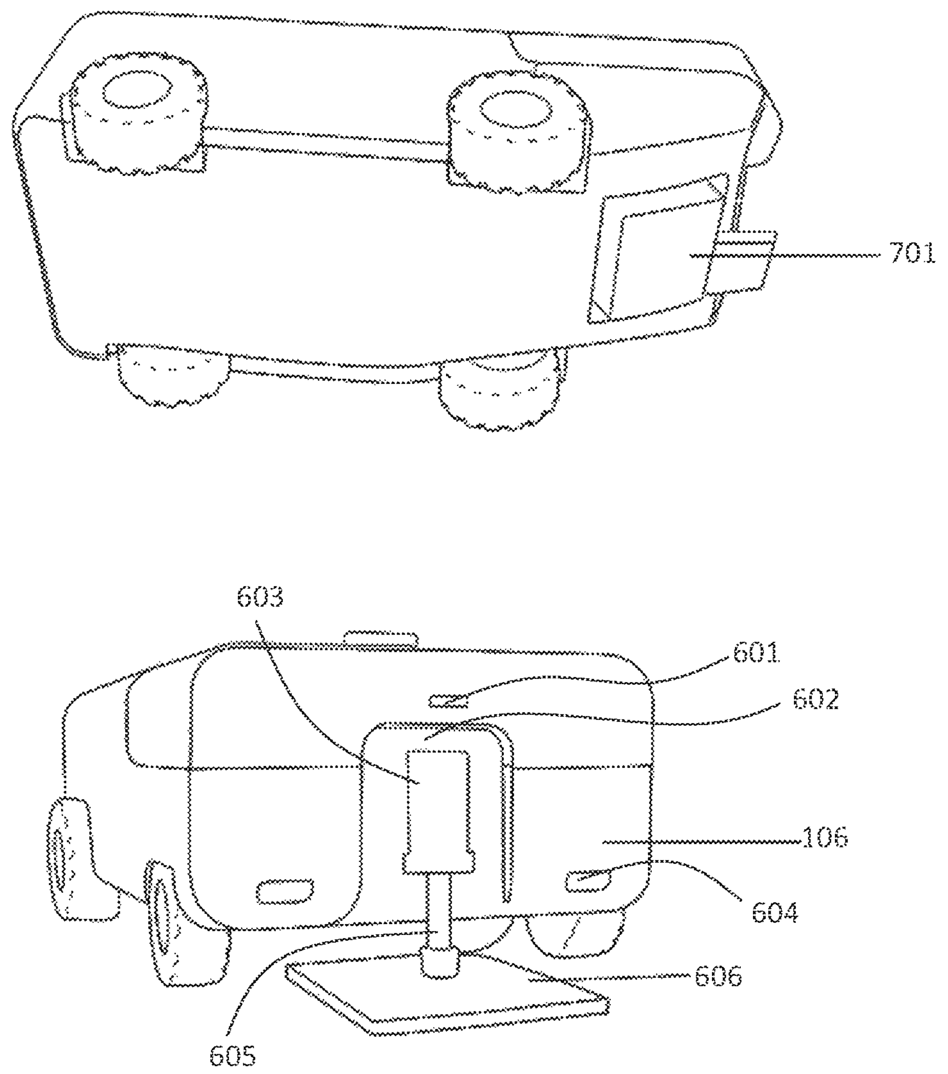
FIG. 11 shows a bottom and front view of an autonomous ground inspection vehicle according to an embodiment of the present disclosure.

Referring to FIG. 11, the autonomous ground inspection vehicle 106 may include components arranged on a front portion of the vehicle for GPR inspection operations. FIG. 11 illustrates a front view of the autonomous ground inspection vehicle 106 showing the arrangement of components that enable altitude and tilt adjustment of the GPR antenna during inspection operations.

The autonomous ground inspection vehicle 106 may include a depth camera 601 positioned on the front portion of the vehicle. The depth camera 601 may be configured to capture depth information of an inspected surface during ground-based inspection operations. In some cases, the depth camera 601 provides real-time surface geometry data that enables automatic adjustment of the GPR antenna position based on variations in the terrain being inspected.

With continued reference to FIG. 11, the autonomous ground inspection vehicle 106 may include a servo motor 602 located below the depth camera 601. The servo motor 602 may be configured to control a tilt degree of a GPR antenna 701. In some cases, the servo motor 602 rotates to adjust the tilt angle of the GPR antenna 701 relative to the inspected surface. The GPR antenna 701 tilt degree may be adjusted up to 90 degrees using the servo motor 602, enabling the GPR antenna 701 to be oriented for inspection of surfaces at various angles including vertical surfaces.

The autonomous ground inspection vehicle 106 may include a telescopic height adjustment mechanism comprising a first telescopic section 603, a second telescopic section 605, and a third telescopic section 606. The first telescopic section 603 may be positioned adjacent to the servo motor 602, with the second telescopic section 605 extending below the first telescopic section 603, and the third telescopic section 606 extending further downward to support the GPR antenna 701. The telescopic height adjustment mechanism may use linear actuators that convert rotational movement of motors into linear displacement for altitude adjustment of the GPR antenna 701. In some cases, the linear actuators extend or retract the first telescopic section 603, the second telescopic section 605, and the third telescopic section 606 to adjust the vertical position of the GPR antenna 701 relative to the inspected surface.

As further shown in FIG. 11, the autonomous ground inspection vehicle 106 may include a collision avoidance sensor 604 mounted on a side of the vehicle. The collision avoidance sensor 604 may be configured to detect obstacles during navigation and prevent collisions that could damage the GPR antenna 701 or other components of the autonomous ground inspection vehicle 106. In some cases, the collision avoidance sensor 604 provides distance measurements to nearby objects, enabling the data processing/control circuit to adjust the vehicle speed and direction to avoid contact with detected obstacles.

The GPR antenna 701 may be connected to the third telescopic section 606 and positioned at a lower portion of the telescopic height adjustment mechanism. In some cases, the GPR antenna 701 is oriented to direct radar signals toward the ground surface during inspection operations. The combination of the telescopic height adjustment mechanism and the servo motor 602 enables dynamic positioning of the GPR antenna 701 in both vertical altitude and angular orientation, allowing the system to maintain appropriate proximity and alignment with inspected surfaces having varying geometries.

The autonomous ground inspection vehicle 106 may include an automated attachment mechanism and processing circuits that enable navigation and control of attachment and detachment operations with the detachable GPR inspection platform 104.

The detachable GPR inspection platform 104 may include platform legs that extend from a lower portion of the detachable GPR inspection platform 104. The platform legs may be configured to engage with the attachment interface of the autonomous ground inspection vehicle 106 during the attachment process. In some cases, the platform legs are arranged in a configuration that aligns with corresponding pressure sensors and servo motors within the autonomous ground inspection vehicle 106.

The platform legs of the detachable GPR inspection platform 104 may be aligned with the autonomous ground inspection vehicle 106. In the aligned position, the platform legs may be positioned above the pressure sensors within the attachment interface of the autonomous ground inspection vehicle 106. The alignment between the platform legs and the autonomous ground inspection vehicle 106 may be achieved through manual positioning or through automated guidance using sensor feedback.

The platform legs may push against the pressure sensors located on the autonomous ground inspection vehicle 106. When the platform legs descend and make contact with the pressure sensors, the pressure sensors may generate a signal indicating that contact has occurred. The signal from the pressure sensors may be transmitted to the data processing/control circuit within the autonomous ground inspection vehicle 106.

In the completed attachment process the servo motors may have rotated by 90 degrees in response to the pressure sensor activation. The 90-degree rotation of the servo motors may secure the platform legs to the autonomous ground inspection vehicle 106, thereby establishing a stable mechanical coupling that maintains the detachable GPR inspection platform 104 in position during ground-based inspection operations.

The autonomous ground inspection vehicle 106 may include a battery that provides electrical power to the electronic components within the vehicle. The battery may supply power to the processing circuits, communication circuits, navigation modules, and servo motors that enable autonomous operation and attachment control functions. In some cases, the battery is positioned within a compartment of the autonomous ground inspection vehicle 106 to facilitate efficient power distribution to adjacent electronic components.

The autonomous ground inspection vehicle 106 may include a Tx/Rx circuit that enables wireless communication. The Tx/Rx circuit may be configured to receive remote control signals from an operator and to transmit status information to external devices. In some cases, the Tx/Rx circuit receives control signals that initiate detachment sequences, wherein the operator transmits a signal to release the platform legs from the autonomous ground inspection vehicle 106. The Tx/Rx circuit may also transmit navigation data, sensor readings, and operational status information to a remote monitoring station.

The autonomous ground inspection vehicle 106 may include a GPS module configured to provide positioning data for navigation along a preset inspection path. The GPS module may receive Global Positioning System signals and process the signals to determine the current position of the autonomous ground inspection vehicle 106. In embodiments, the GPS module provides continuous positioning updates to the data processing/control circuit, enabling the autonomous ground inspection vehicle 106 to follow a predetermined inspection route with precision.

The autonomous ground inspection vehicle 106 may include a voltage regulator circuit that regulates power supplied from the battery to the various electronic components. The voltage regulator circuit may ensure stable voltage levels for the Tx/Rx circuit, the GPS module, the data processing/control circuit, and the servo motors. In some cases, the voltage regulator circuit protects the electronic components from voltage fluctuations that could affect circuit operation or cause damage to sensitive components.

The autonomous ground inspection vehicle 106 may include the data processing/control circuit that processes sensor data and controls vehicle navigation and attachment operations. The data processing/control circuit may receive positioning data from the GPS module and obstacle detection data from the collision avoidance sensor 105 to determine appropriate speed and direction adjustments for the autonomous ground inspection vehicle 106. In some cases, the data processing/control circuit compares the current position obtained from the GPS module with the preset inspection path and generates control signals to adjust the vehicle trajectory to maintain alignment with the predetermined route.

The data processing/control circuit may also control the attachment and detachment operations between the detachable GPR inspection platform 104 and the autonomous ground inspection vehicle 106. When the pressure sensors detect contact with the platform legs, the data processing/control circuit may receive the signal from the pressure sensors and send a control signal to the servo motors to rotate 90 degrees, thereby securing the platform legs to the autonomous ground inspection vehicle 106. When the operator transmits a detachment signal via the Tx/Rx circuit, the data processing/control circuit may process the signal and instruct the servo motors to rotate 90 degrees in an opposite direction, thereby releasing the platform legs and enabling the detachable GPR inspection platform 104 to be lifted by the drone 101 for transition to airborne inspection operations.

The interaction between the circuits within the autonomous ground inspection vehicle 106 may enable coordinated navigation and attachment control functions. The GPS module provides positioning data to the data processing/control circuit for navigation control, while the collision avoidance sensor 105 provides obstacle detection data that enables the data processing/control circuit to adjust the vehicle path to avoid collisions. The Tx/Rx circuit enables communication with remote operators for receiving control instructions and transmitting operational status. The voltage regulator circuit ensures stable power distribution from the battery to all electronic components, enabling reliable operation of the navigation and attachment control systems during ground-based inspection operations.

Figure 12:
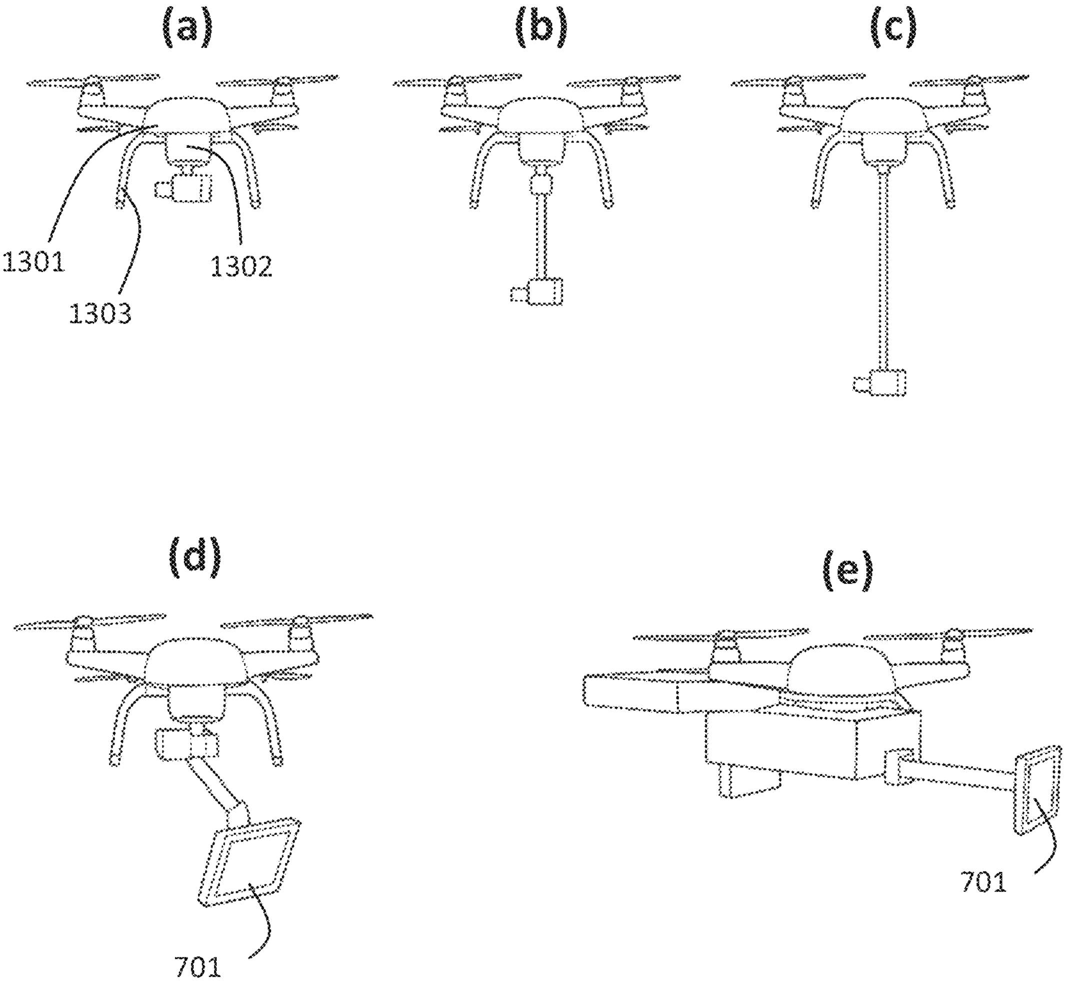
FIG. 12 shows orthogonal views of a drone altitude adjustment telescopic mechanism according to an embodiment of the present disclosure.

Referring to FIG. 12, the hybrid GPR inspection system may include a drone altitude adjustment telescopic mechanism that enables vertical positioning of the detachable GPR inspection platform relative to a drone during airborne inspection operations. FIG. 12 illustrates orthogonal views of the drone altitude adjustment telescopic mechanism in three different configurations, showing a drone 1301, a detachable GPR inspection platform 1302, and platform legs 1303.

In configuration (a), the drone 1301 may be shown in a stationary mode with the detachable GPR inspection platform 1302 positioned directly beneath the drone 1301. The platform legs 1303 may extend downward from the detachable GPR inspection platform 1302 in a compact arrangement. In the stationary mode, the telescopic mechanism may be in a retracted state, with the detachable GPR inspection platform 1302 positioned at a minimum vertical distance from the drone 1301. The compact arrangement of the platform legs 1303 and the retracted telescopic mechanism may provide a stable configuration for transport or when altitude adjustment is not required.

With continued reference to FIG. 12, configuration (b) illustrates the drone altitude adjustment telescopic mechanism with a first telescopic region extended. The extension of the first telescopic region may increase the vertical distance between the drone 1301 and the detachable GPR inspection platform 1302. The platform legs 1303 may remain attached to a bottom of the detachable GPR inspection platform 1302 during the extension of the first telescopic region. In some cases, the first telescopic region is extended by a linear actuator that converts rotational movement into linear displacement, thereby lowering the detachable GPR inspection platform 1302 relative to the drone 1301.

As further shown in FIG. 12, configuration (c) illustrates the drone altitude adjustment telescopic mechanism with a second telescopic region extended. The extension of the second telescopic region may further increase the separation distance between the drone 1301 and the detachable GPR inspection platform 1302. The platform legs 1303 may continue to extend from the detachable GPR inspection platform 1302 in the fully extended configuration. In some cases, the second telescopic region 605 is extended sequentially after the first telescopic region 603 to achieve a maximum vertical separation between the drone 1301 and the detachable GPR inspection platform 1302.

The telescopic height adjustment mechanism may include multiple telescopic regions that can be extended sequentially for altitude adjustment during drone-mounted operations. The sequential extension of the first telescopic region and the second telescopic region may enable the GPR antenna housed within the detachable GPR inspection platform 1302 to be positioned at varying distances from the drone 1301. In some cases, the sequential telescopic extension enables the system to maintain the GPR antenna at an appropriate proximity to an inspected surface while the drone 1301 maintains a safe flight altitude above obstacles or terrain features.

The drone altitude adjustment telescopic mechanism may enable dynamic altitude adjustment of the GPR antenna relative to the drone 1301 during aerial inspection operations. In some cases, the telescopic mechanism extends to lower the detachable GPR inspection platform 1302 toward an inspected surface, enabling the GPR antenna to capture subsurface data at closer proximity to the surface. The ability to adjust the vertical position of the detachable GPR inspection platform 1302 relative to the drone 1301 may enable the system to accommodate varying surface geometries and maintain consistent imaging performance across different inspection scenarios.

Configurations (d) and (e) show the GPR antenna 701 being controlled by one or more servo motors to adjust the tilt angle of the GPR antenna 701 so that it is able to maintain an orthogonal relationship with the surface being inspected.

Figure 13:
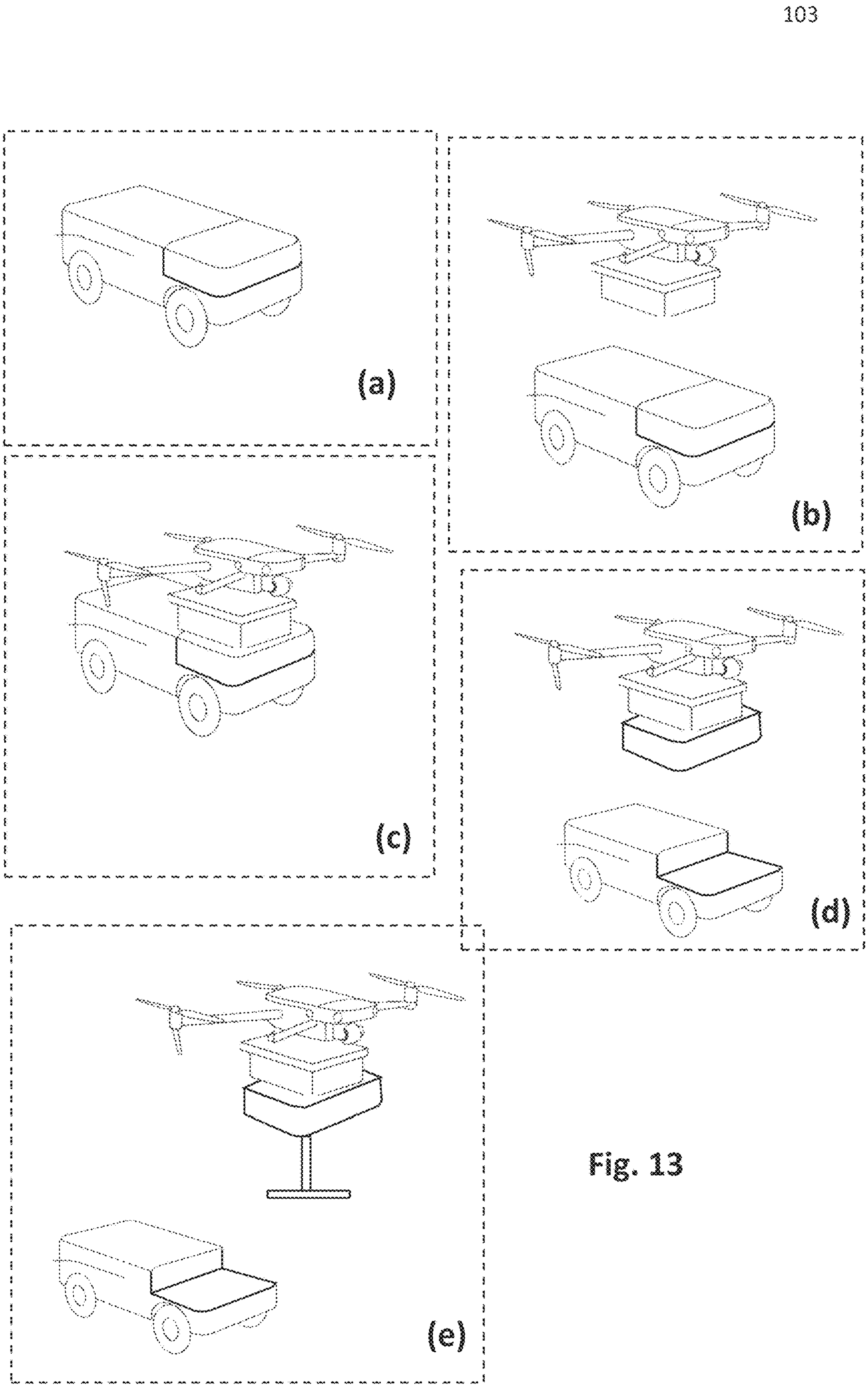
FIG. 13 shows an orthogonal view of a ground inspection process and transition to drone-mounted GPR inspection according to an embodiment of the present disclosure.

Referring to FIG. 13, the hybrid GPR inspection system may operate through a ground inspection process and transition sequence that enables conversion from ground-based inspection mode to drone-mounted inspection mode. FIG. 13 illustrates an orthogonal view depicting the ground inspection process using an autonomous ground vehicle and the transition to drone-mounted GPR inspection through a five-stage sequence labeled (a) through (e).

In stage (a), the autonomous ground inspection vehicle may operate independently while performing ground-based GPR inspection. The autonomous ground inspection vehicle may navigate along a preset inspection path using positioning data from a GPS module and obstacle detection data from collision avoidance sensors. During ground-based inspection, the detachable GPR inspection platform may be mounted on the autonomous ground inspection vehicle, with the GPR antenna positioned to direct radar signals toward the ground surface for subsurface imaging. In some cases, the ground-based inspection mode enables the GPR antenna to maintain close proximity to the inspected surface, which may provide improved imaging resolution compared to aerial inspection at greater distances.

With continued reference to FIG. 13, stage (b) illustrates the initiation of operational mode conversion, where a drone aligns with the autonomous ground inspection vehicle in preparation for attachment. The drone may descend toward the autonomous ground inspection vehicle while a downward facing camera mounted on a drone attachment platform captures video feed of the detachable GPR inspection platform. In some cases, the alignment process is performed remotely by an operator who views the live video feed and provides control instructions to adjust the position of the drone. In other cases, the alignment process is performed automatically using artificial intelligence-driven computer vision algorithms that analyze the video feed and calculate spatial adjustments for the drone to achieve alignment with the detachable GPR inspection platform.

Stage (c) depicts the drone attachment platform connecting to the detachable GPR inspection platform mounted on the autonomous ground inspection vehicle. When the drone attachment platform descends and makes contact with pressure sensors positioned on a top surface of the detachable GPR inspection platform, the pressure sensors may generate a signal that is transmitted to a data processing and control circuit. The data processing and control circuit may send a control signal to a servo motor to rotate, thereby securing the drone attachment platform to the detachable GPR inspection platform. In some cases, the automated attachment mechanism establishes a stable mechanical coupling between the drone attachment platform and the detachable GPR inspection platform without requiring manual intervention.

As further shown in FIG. 13, stage (d) depicts the detachable GPR inspection platform becoming fully airborne as the drone lifts the platform away from the autonomous ground inspection vehicle. Prior to lifting, a detachment sequence may be initiated by transmitting a remote control signal to the autonomous ground inspection vehicle. The remote control signal may instruct servo motors within the autonomous ground inspection vehicle to rotate in an opposite direction from the locking rotation, thereby releasing platform legs of the detachable GPR inspection platform from the autonomous ground inspection vehicle. Once the platform legs are released, the drone may ascend and carry the detachable GPR inspection platform for transition to airborne inspection operations.

Stage (e) illustrates the drone-mounted GPR inspection system with the GPR antenna altitude extended via a telescopic mechanism. The telescopic mechanism may extend to lower the detachable GPR inspection platform toward an inspected surface, enabling the GPR antenna to be positioned at an appropriate distance from the surface for subsurface imaging. In some cases, the telescopic mechanism includes multiple telescopic regions that can be extended sequentially to achieve varying vertical separation distances between the drone and the detachable GPR inspection platform. The extended configuration may enable the GPR antenna to maintain proximity to inspected surfaces while the drone maintains a safe flight altitude above obstacles or terrain features.

The autonomous ground vehicle may carry the detachable GPR inspection platform, which houses the GPR antenna for subsurface imaging. The ground-based configuration may enable inspection of ground level surfaces and areas accessible by wheeled vehicles, while the transition to drone-mounted operation may enable inspection of vertical structures, elevated surfaces, or areas inaccessible to ground vehicles.

The seamless transition between ground-based and drone-mounted operational modes may enable the hybrid GPR inspection system to utilize the same GPR antenna for inspection of surfaces with varying geometric characteristics. In some cases, the ability to transition between operational modes without changing the GPR antenna may reduce equipment costs compared to systems that employ separate antennas for ground-based and aerial inspection. The use of a single GPR antenna across both operational modes may also mitigate readings distortion that can result from using different antennas with varying characteristics, which may provide improved evaluation accuracy when comparing radargrams collected during ground-based inspection with radargrams collected during drone-based inspection.

The transition sequence may enable rapid conversion between operational modes during a single inspection session. In some cases, the autonomous ground inspection vehicle performs ground-based inspection of accessible areas, and the system transitions to drone-mounted operation when the inspection path encounters vertical structures, elevated surfaces, or terrain that impedes ground vehicle navigation. The automated attachment and detachment mechanisms may enable the transition to be performed without manual handling of the detachable GPR inspection platform, which may reduce inspection time and labor requirements. The ability to perform both ground-based and aerial inspection using the same GPR antenna may enable comprehensive evaluation of structures with complex geometries, including rocky formations with cavities, demolished buildings, uneven landscapes, and archeological sites with varying elevation and surface characteristics.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. A Ground Penetrating Radar (GPR) inspection system, comprising:

an autonomous vehicle module configured for ground-based navigation;

an unmanned aerial vehicle module configured for aerial flight; and a GPR module comprising a detachable GPR inspection platform housing a GPR antenna, the GPR module being switchable between a first operational mode in which the detachable GPR inspection platform is mounted on the autonomous vehicle module for GPR inspection from a ground mounted position, and a second operational mode in which the detachable GPR inspection platform is mounted on the unmanned aerial vehicle module for GPR inspection from an aerial mounted position, wherein the GPR module comprises an automated attachment mechanism configured to selectively secure the detachable GPR inspection platform to either the autonomous vehicle module or the unmanned aerial vehicle module.

2. The GPR inspection system of claim 1, wherein the automated attachment mechanism comprises:

a first attachment mechanism configured to secure the detachable GPR inspection platform to the autonomous vehicle module; and a second attachment mechanism configured to secure the detachable GPR inspection platform to the unmanned aerial vehicle module.

3. The GPR inspection system of claim 2, wherein the first attachment mechanism comprises at least one pressure sensor and at least one servo motor, wherein the at least one servo motor is configured to rotatably engage with the detachable GPR inspection platform in response to the at least one pressure sensor detecting contact with the detachable GPR inspection platform.

4. The GPR inspection system of claim 2, wherein the second attachment mechanism comprises at least one pressure sensor positioned on a top surface of the detachable GPR inspection platform and a servo motor configured rotatably engage with the unmanned aerial vehicle module in response to the at least one pressure sensor detecting contact with the unmanned aerial vehicle module.

5. The GPR inspection system of claim 1, wherein the unmanned aerial vehicle module comprises a drone attachment platform having a downward facing camera configured to facilitate alignment between the unmanned aerial vehicle module and the detachable GPR inspection platform during transition between the first operational mode and the second operational mode.

6. The GPR inspection system of claim 5, comprising a data processing circuit configured to execute an artificial intelligence-driven computer vision algorithm to calculate spatial adjustments required for the unmanned aerial vehicle module to achieve alignment with the detachable GPR inspection platform based on video feed from the downward facing camera.

7. The GPR inspection system of claim 1, wherein the GPR module comprises an antenna positioning mechanism configured to adjust at least one of an altitude and a tilt angle of the GPR antenna.

8. The GPR inspection system of claim 7, wherein the antenna positioning mechanism comprises:

a telescopic mechanism comprising a plurality of telescopic sections configured to adjust the altitude of the GPR antenna; and a servo motor configured to adjust the tilt angle of the GPR antenna.

9. The GPR inspection system of claim 7, comprising a depth camera configured to capture depth information of an inspected surface, and a data processing circuit configured to automatically adjust the at least one of the altitude or the tilt angle of the GPR antenna based on the depth information captured by the depth camera.

10. The GPR inspection system of claim 1, wherein the autonomous vehicle module comprises:

a GPS module configured to provide positioning data for navigation along a preset inspection path; and at least one collision avoidance sensor configured to detect obstacles during ground-based navigation.

11. The GPR inspection system of claim 1, wherein the detachable GPR inspection platform comprises a data processing circuit, a wireless transceiver circuit, and a battery, the data processing circuit being configured to control the automated attachment mechanism and to communicate with an operator via the wireless transceiver circuit.

* * * * *